(12) United States Patent
Hayasaka et al.

(10) Patent No.: US 11,438,570 B2
(45) Date of Patent: Sep. 6, 2022

(54) DATA PROCESSING APPARATUS AND DATA PROCESSING METHOD FOR GENERATION OF CALIBRATION DATA FOR PERFORMING IMAGE PROCESSING

(71) Applicant: SONY CORPORATION, Tokyo (JP)

(72) Inventors: Kengo Hayasaka, Kanagawa (JP); Katsuhisa Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/051,967

(22) PCT Filed: Apr. 25, 2019

(86) PCT No.: PCT/JP2019/017568
§ 371 (c)(1),
(2) Date: Oct. 30, 2020

(87) PCT Pub. No.: WO2019/216229
PCT Pub. Date: Nov. 14, 2019

(65) Prior Publication Data
US 2021/0243422 A1 Aug. 5, 2021

(30) Foreign Application Priority Data
May 9, 2018 (JP) .............................. JP2018-090355

(51) Int. Cl.
*H04N 13/246* (2018.01)
*H04N 13/225* (2018.01)
(Continued)

(52) U.S. Cl.
CPC ....... *H04N 13/246* (2018.05); *H04N 5/23212* (2013.01); *H04N 5/23296* (2013.01); *H04N 13/225* (2018.05); *H04N 13/282* (2018.05)

(58) Field of Classification Search
CPC .. H04N 13/225; H04N 13/246; H04N 13/282; H04N 17/00; H04N 17/002;
(Continued)

(56) References Cited

U.S. PATENT DOCUMENTS

2006/0077543 A1 4/2006 Miyoshi et al.
2012/0229628 A1* 9/2012 Ishiyama ........... H04N 5/23293
348/135
(Continued)

FOREIGN PATENT DOCUMENTS

CN 102597693 A 7/2012
EP 1637837 A1 3/2006
(Continued)

OTHER PUBLICATIONS

International Search Report and Written Opinion of PCT Application No. PCT/JP2019/017568, dated Jul. 2, 2019, 10 pages of ISRWO.
(Continued)

*Primary Examiner* — James T Boylan
(74) *Attorney, Agent, or Firm* — Chip Law Group

(57) ABSTRACT

The present technology relates to a data processing apparatus, a data processing method, and a program that are capable of generating calibration data for performing appropriate image processing. The data processing apparatus performs interpolation to generate calibration data for a predetermined focus position by using calibration data for a plurality of focus positions. The calibration data for the plurality of focus positions is generated from a calibration image captured at the plurality of focus positions. The calibration image is obtained by capturing an image of a known object in the plurality of focus positions with a multi-lens camera that captures an image from two or more viewpoints. The present technology is applicable, for
(Continued)

example, to a multi-lens camera that captures an image from two or more viewpoints.

6 Claims, 14 Drawing Sheets

(51) Int. Cl.
*H04N 13/282* (2018.01)
*H04N 5/232* (2006.01)

(58) Field of Classification Search
CPC .. H04N 5/225; H04N 5/22541; H04N 5/2258; H04N 5/23212; H04N 5/23296
See application file for complete search history.

(56) References Cited

U.S. PATENT DOCUMENTS

| | | | | |
|---|---|---|---|---|
| 2013/0063558 | A1* | 3/2013 | Phipps | H04N 13/204 348/43 |
| 2013/0141525 | A1* | 6/2013 | Williams | G06T 7/00 348/38 |
| 2015/0304617 | A1* | 10/2015 | Chang | H04N 13/254 348/189 |
| 2017/0332067 | A1* | 11/2017 | Ichihara | H04N 5/232133 |
| 2019/0058870 | A1* | 2/2019 | Rowell | H04N 9/8205 |
| 2019/0158813 | A1* | 5/2019 | Rowell | H04N 13/189 |

FOREIGN PATENT DOCUMENTS

| | | | | |
|---|---|---|---|---|
| JP | 2008-241491 | * | 10/2008 | G01B 11/245 |
| JP | 2008-241491 A | | 10/2008 | |
| JP | 2013-113600 | * | 6/2013 | G01B 11/245 |
| JP | 2013-113600 A | | 6/2013 | |
| WO | 2004/106858 A1 | | 12/2004 | |
| WO | 2011/058876 A1 | | 5/2011 | |

OTHER PUBLICATIONS

Zhengyou Zhang, "A Flexible New Technique for Camera Calibration", IEEE Transactions on Pattern Analysis and Machine Intelligence, vol. 22, No. 11, Nov. 2000, 5 pages.

Zhengyou Zhang, "A Flexible New Technique for Camera Calibration", IEEE Transactions on Pattern Analysis and Machine Intelligence, vol. 22, No. 11, 1330-1334, 2000, 22 Pages.

* cited by examiner

FIG. 7
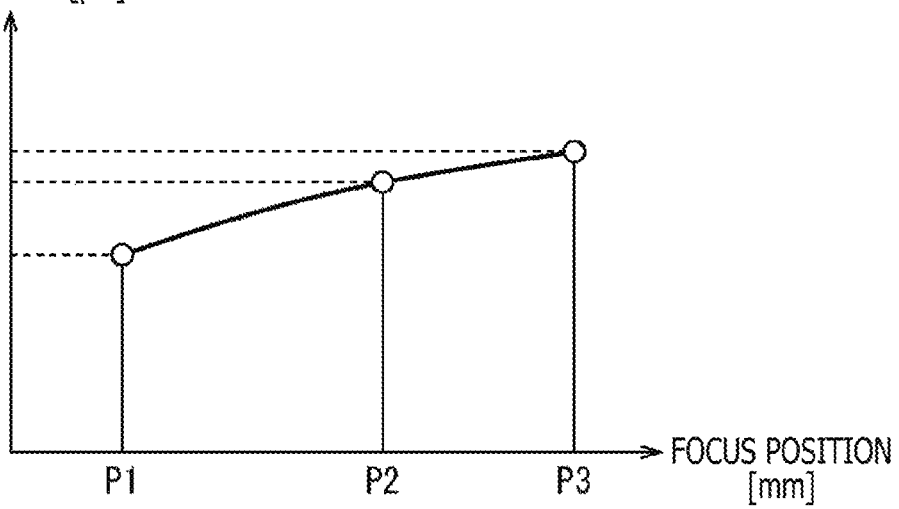
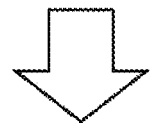
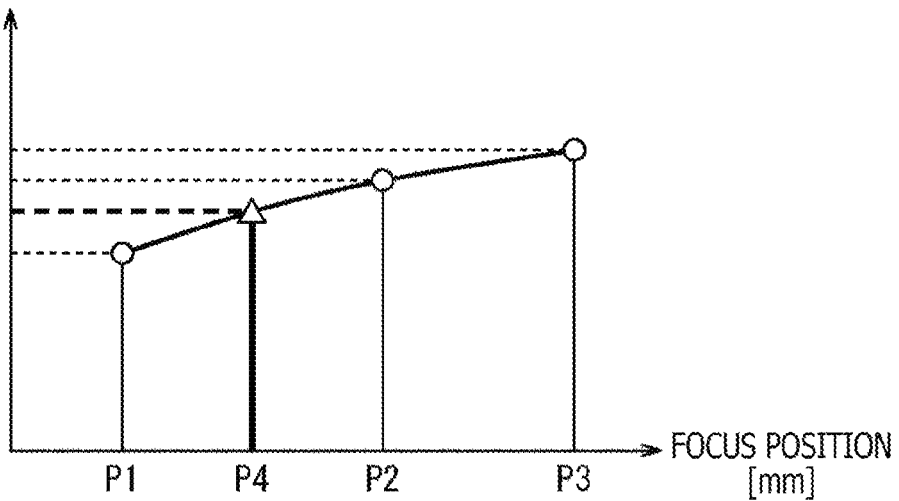

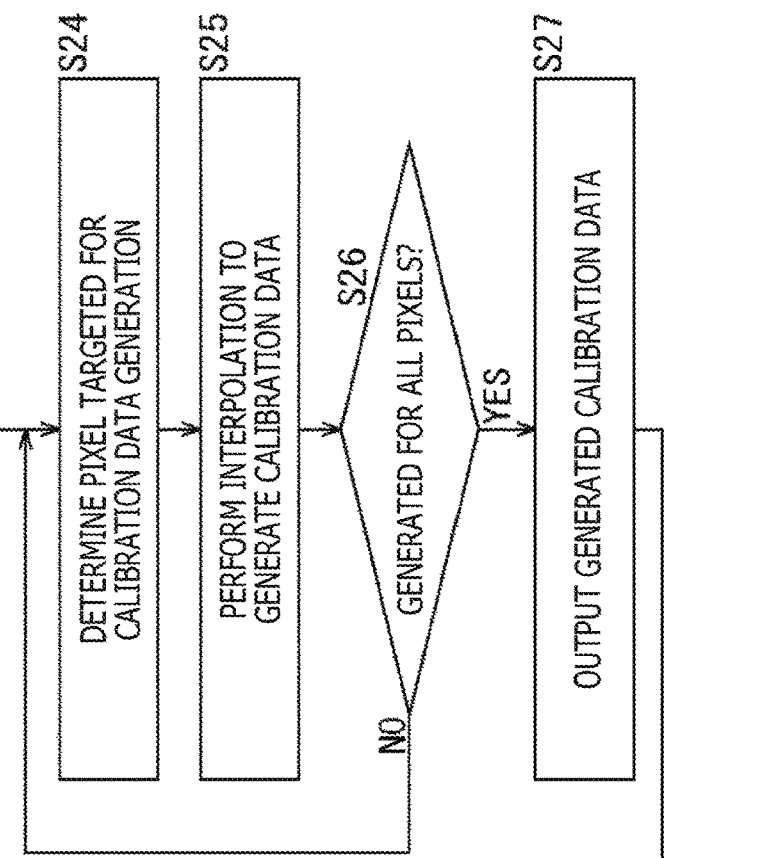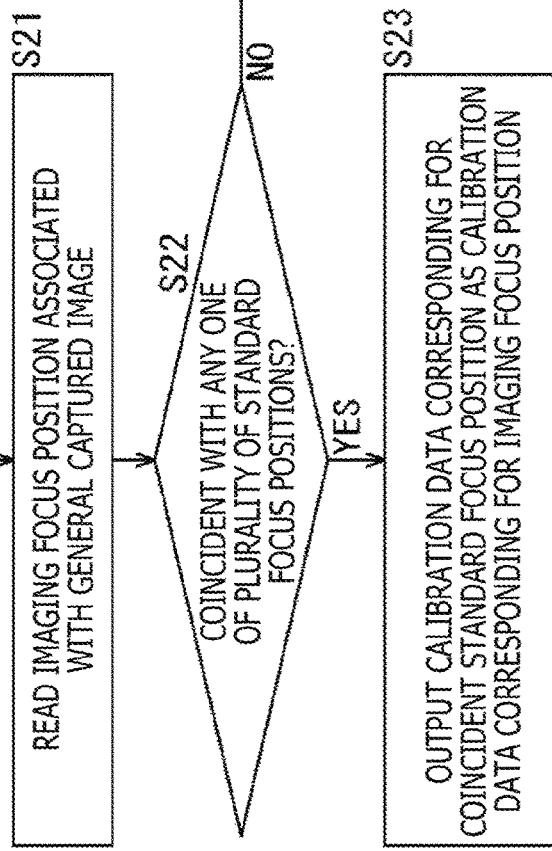
FIG. 9

FIG.12
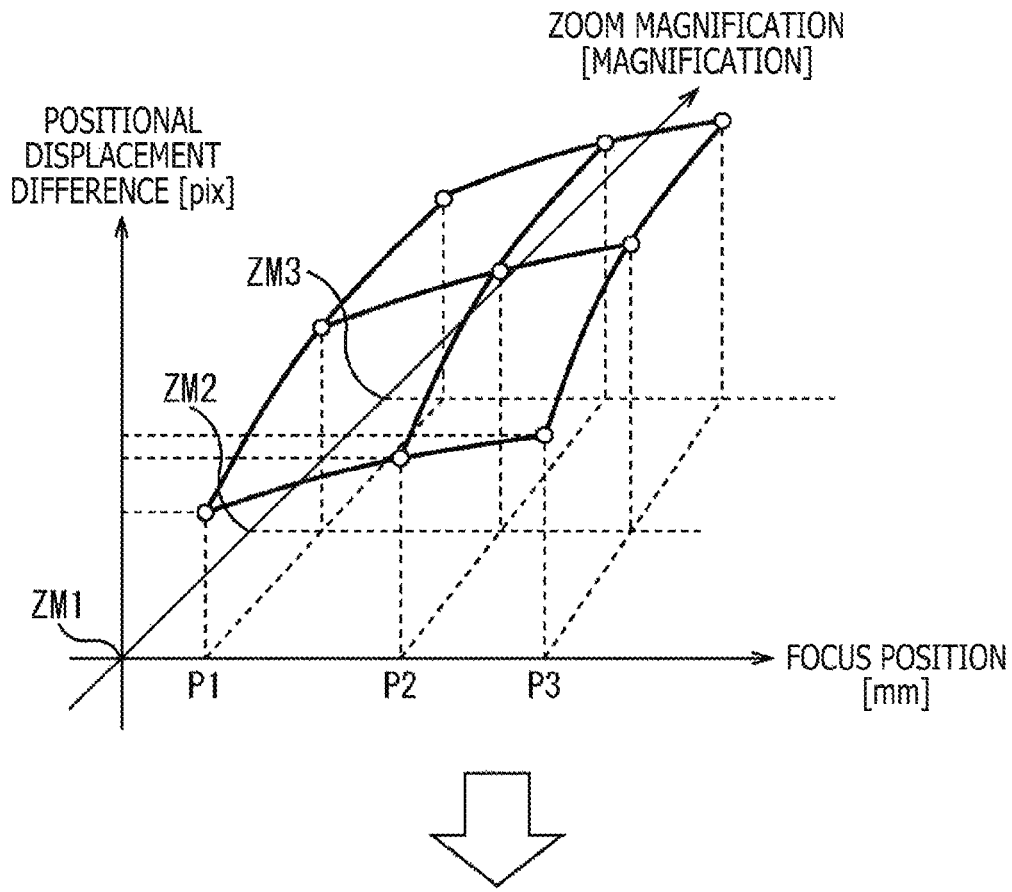
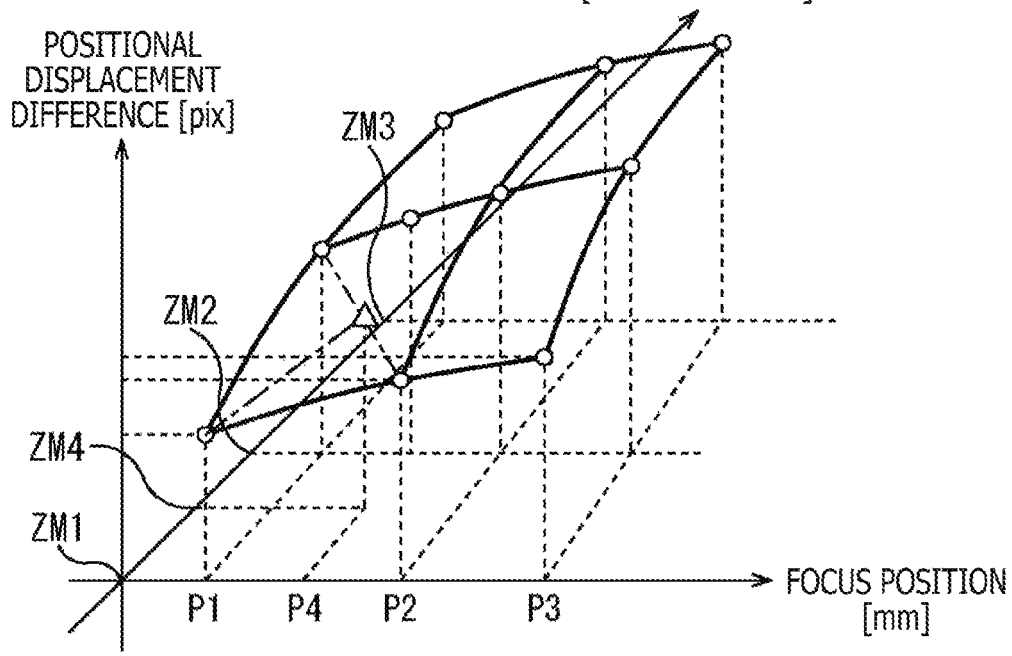

DATA PROCESSING APPARATUS AND DATA PROCESSING METHOD FOR GENERATION OF CALIBRATION DATA FOR PERFORMING IMAGE PROCESSING

CROSS REFERENCE TO RELATED APPLICATIONS

This application is a U.S. National Phase of International Patent Application No. PCT/JP2019/017568 filed on Apr. 25, 2019, which claims priority benefit of Japanese Patent Application No. JP 2018-090355 filed in the Japan Patent Office on May 9, 2018. Each of the above-referenced applications is hereby incorporated herein by reference in its entirety.

TECHNICAL FIELD

The present technology relates to a data processing apparatus, a data processing method, and a program, and more particularly, to a data processing apparatus, a data processing method, and a program that are capable of generating calibration data for performing appropriate image processing.

BACKGROUND ART

In a case where, for example, feature point matching or block matching is to be performed to generate parallax information regarding parallax from a plurality of images that are captured from different viewpoints by using a stereo camera or other multi-lens camera having a plurality of lenses, calibration is performed initially to generate calibration data in the form of parameters representing, for example, the lens position and lens distortion of each of the plurality of lenses and the difference in the posture of the lenses of the multi-lens camera in order to eliminate the influence exerted by the lens position and lens distortion of each of the plurality of lenses and the difference in the posture of the lenses. In this instance, the parallax information is, for example, a disparity indicating the parallax by the number of pixels or a depth distance corresponding to the parallax.

A calibration technique described, for example, in NPL 1 generates calibration data from a calibration image. The calibration image is a captured image obtained by capturing an image of a two-dimensional chart for calibration that is a known object (hereinafter referred to also as a calibration chart).

CITATION LIST

Non Patent Literature

[NPL 1]
Zhengyou Zhang, "A Flexible New Technique for Camera Calibration," IEEE TRANSACTIONS ON PATTERN ANALYSIS AND MACHINE INTELLIGENCE, VOL. 22, NO. 11

SUMMARY

Technical Problems

Incidentally, in general calibration, control is exercised so as to set a focus position of a multi-lens camera at a predetermined distance, and then an image of a calibration chart disposed in the focus position or in a position at a predetermined distance within a depth of field is captured. Subsequently, a calibration image obtained by capturing the image of the calibration chart is used to generate calibration data for the focus position of the multi-lens camera that is controlled at a predetermined distance.

The calibration data generated in the above-described manner relates to the focus position of the multi-lens camera that is employed to capture the image of the calibration chart. Therefore, if the calibration data is used to perform image processing on a captured image of a general object in a case where, for example, the focus position in which the image of the general object is captured differs from the focus position in which the image of the calibration chart is captured, it is possible that an inappropriate image processing may be performed.

The present technology has been made in view of the above circumstances, and makes it possible to generate calibration data for performing appropriate image processing.

Solution to Problems

A data processing apparatus according to the present technology includes an interpolation section that performs interpolation to generate calibration data for a predetermined focus position by using calibration data for a plurality of focus positions, the calibration data for the plurality of focus positions being generated from a calibration image captured at the plurality of focus positions, the calibration image being obtained by capturing an image of a known object in the plurality of focus positions with a multi-lens camera that captures an image from two or more viewpoints.

A data processing method according to the present technology includes performing interpolation to generate calibration data for a predetermined focus position by using calibration data for a plurality of focus positions, the calibration data for the plurality of focus positions being generated from a calibration image captured at the plurality of focus positions, the calibration image being obtained by capturing an image of a known object in the plurality of focus positions with a multi-lens camera that captures an image from two or more viewpoints.

The data processing apparatus, the data processing method, and the program according to the present technology perform interpolation to generate calibration data for a predetermined focus position by using calibration data for a plurality of focus positions. The calibration data for the plurality of focus positions is generated from a calibration image captured at the plurality of focus positions. The calibration image is obtained by capturing an image of a known object in the plurality of focus positions with a multi-lens camera that captures an image from two or more viewpoints.

The data processing method according to the present technology includes generating calibration data for a plurality of focus positions from a calibration image captured at a plurality of focus positions, the calibration image being obtained by capturing an image of a known object in the plurality of focus positions with a multi-lens camera that captures an image from two or more viewpoints.

The data processing method according to the present technology generates calibration data for a plurality of focus positions from a calibration image captured at the plurality of focus positions, the calibration image being obtained by capturing an image of a known object in the plurality of focus positions with a multi-lens camera that captures an image from two or more viewpoints.

Advantageous Effect of Invention

The present technology is capable of generating calibration data for performing appropriate image processing.

It should be noted that the present technology is not necessarily limited to the above effect. The present technology may provide any other advantages described in the present disclosure.

BRIEF DESCRIPTION OF DRAWINGS

FIG. 7 is a set of diagrams illustrating how interpolation is performed to generate calibration data for an imaging focus position P4.

FIG. 9 is a flowchart illustrating an example of a process of generating calibration data for the imaging focus position.

FIG. 12 is a set of diagrams illustrating how interpolation is performed to generate calibration data for a combination of a predetermined focus position and a predetermined zoom magnification.

DESCRIPTION OF EMBODIMENTS

First Embodiment of Multi-Lens Camera to which Present Technology is Applied

Figure 1:
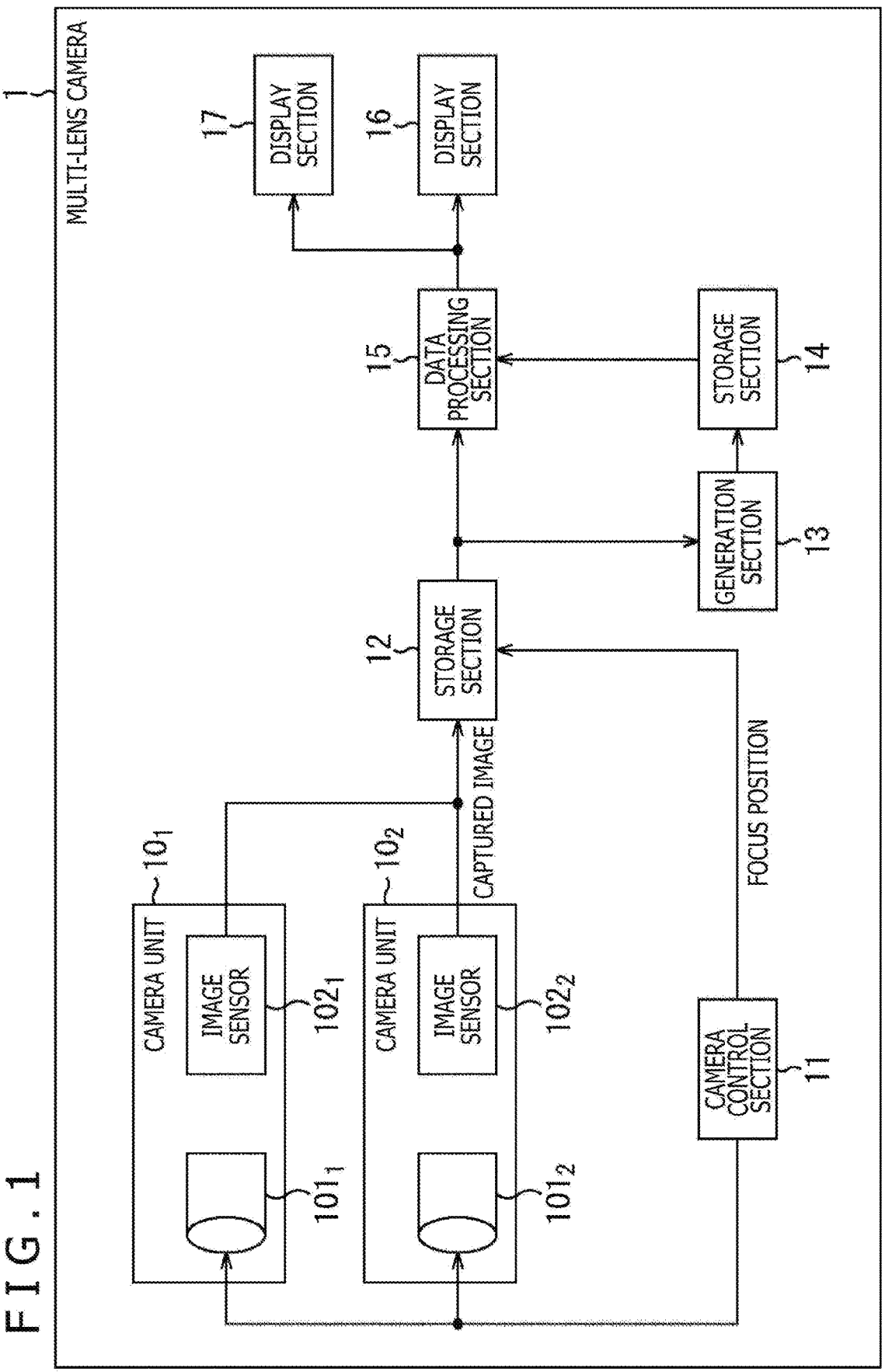
FIG. 1 is a block diagram illustrating a configuration example of a first embodiment of a multi-lens camera to which the present technology is applied.

FIG. 1 is a block diagram illustrating a configuration example of a first embodiment of a multi-lens camera to which the present technology is applied.

The multi-lens camera 1 depicted in FIG. 1 includes camera units $10_1$ and $10_2$, a camera control section 11, a storage section 12, a generation section 13, a storage section 14, a data processing section 15, a display section 16, and a storage section 17.

The camera unit $10_1$ includes a lens $101_1$ and an image sensor $102_1$. The camera unit $10_2$ includes a lens $101_2$ and an image sensor $102_2$.

The lens $101_1$ receives light from an object targeted for imaging, and focuses the received light on the image sensor $102_1$.

The image sensor $102_1$ obtains a captured image by photoelectrically converting the light incident through the lens $101_1$ (the light focused by the lens $101_1$), and supplies the obtained captured image to the storage section 12.

The camera unit $10_2$ (that includes the lens $101_2$ and the image sensor $102_2$) has a configuration similar to that of the camera unit $10_1$ (that includes the lens $101_1$ and the image sensor $102_1$), and will not be redundantly described.

The camera units $10_1$ and $10_2$ are arranged, for example, in a horizontal direction. If the distance between the optical axes of the lenses $101_1$ and $101_2$ is assumed to be a baseline length, the viewpoints of images captured by the camera units $10_1$ and $10_2$ differ from each other only by the baseline length.

The camera control section 11 provides camera control, for example, over their focuses, zoom settings, and apertures of the camera units $10_1$ and $10_2$, respectively. Further, the camera control section 11 recognizes the focus positions (focused focal points) where the camera units $10_1$ and $10_2$ are in focus, respectively, and supplies the recognized focus positions to the storage section 12.

The storage section 12 associates (links) the focus positions supplied from the camera control section 11 with captured images obtained by exercising control to set focus at those focus positions, which are supplied from the image sensors $102_1$ and $102_2$, and stores the resulting association (linkage).

Consequently, the storage section 12 stores captured images captured from different viewpoints that are received respectively from the lenses $101_1$ and $101_2$, that is, captured images captured from two viewpoints (the viewpoints of the camera units $10_1$ and $10_2$). Further, the storage section 12 stores the association between a captured image captured from the viewpoint of the camera unit $10_1$ and a focus position employed to obtain the captured image, and stores the association between a captured image captured from the viewpoint of the camera unit $10_2$ and a focus position employed to obtain the captured image.

The generation section 13 reads a calibration image of a plurality of focus positions that is obtained by capturing an image of a calibration chart at the plurality of focus positions, which are among the captured images stored in the storage section 12, generates calibration data for the plurality of focus positions from the calibration images captured at the plurality of focus positions, and supplies the generated calibration data to the storage section 14.

The storage section 14 stores the calibration data for the plurality of focus positions, which is supplied from the generation section 13.

The data processing section 15 accesses the storage section 12, reads a captured image that is obtained by capturing an image of a general object (an object other than the calibration chart) (hereinafter referred to also as general imaging), and reads a focus position associated with that captured image captured by such general imaging. Further, the data processing section 15 reads the calibration data for the plurality of focus positions from the storage section 14.

The data processing section 15 performs image processing, for example, for the purpose of generating parallax information from the captured image captured by general imaging through the use of the calibration data for the plurality of focus positions, refocusing in order to generate (reconstruct) an image focused, for example, on a certain object through the use of the generated parallax information and the captured image captured by general imaging, and generating an obstacle-free image that is obtained by removing obstacles from a desired object desired by a user.

Subsequently, the data processing section 15 supplies, as needed, the processed image derived from image processing, the captured image captured by general imaging and supplied from the storage section 12 (hereinafter referred to also as the general captured image), and the parallax information generated from the general captured image to the display section 16 and the storage section 17.

The display section 16 displays the processed image, the general captured image, and information regarding, for example, the settings (focus position and zoom magnification) of the camera units $10_1$ and $10_2$, which are supplied from the data processing section 15.

The storage section 17 includes, for example, an undepicted memory card, and stores, for example, the processed image, the general captured image, and the parallax information, which are supplied from the data processing section 15, according to, for example, a user operation.

Although FIG. 1 indicates that the multi-lens camera 1 includes two camera units $10_1$ and $10_2$, the number of camera units included in the multi-lens camera 1 is not limited to two. The multi-lens camera 1 may include three or more camera units as appropriate.

Further, the camera units $10_1$ and $10_2$ may differ from each other in angle of view, resolution, and other specifications. For ease of explanation, however, it is assumed in this document that the camera units $10_1$ and $10_2$ are completely equal in angle of view, resolution, and other specifications.

Figure 2:
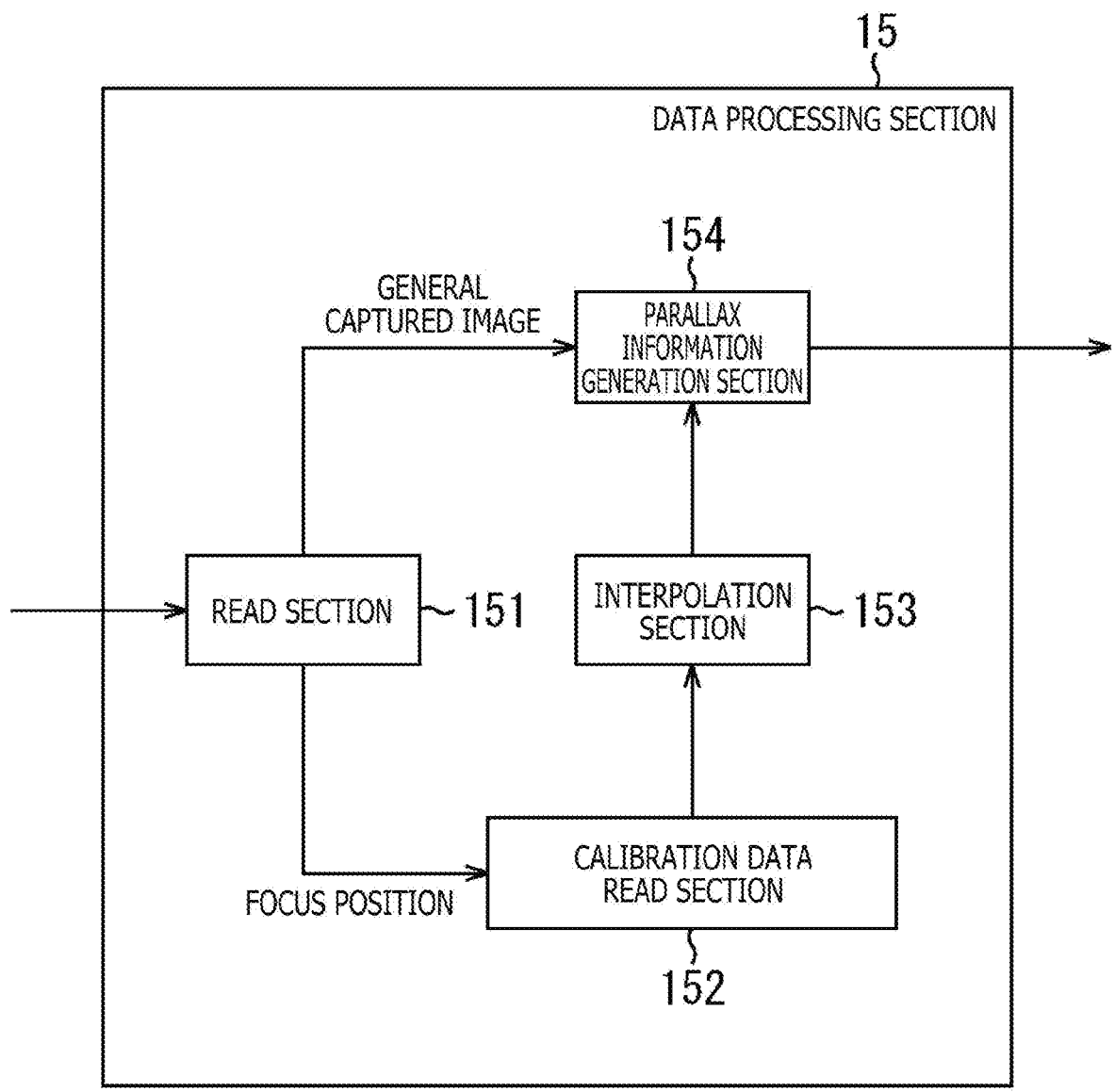
FIG. 2 is a block diagram illustrating a configuration example of a data processing section 15.

FIG. 2 is a block diagram illustrating a configuration example of the data processing section 15.

The data processing section 15 depicted in FIG. 2 includes a read section 151, a calibration data read section 152, an interpolation section 153, and a parallax information generation section 154.

The read section 151 accesses the storage section 12 (FIG. 1), reads general captured images captured from two viewpoints, which are derived from general imaging by the camera units $10_1$ and $10_2$, reads focus positions associated with the general captured images captured from two viewpoints, supplies the read focus positions to the calibration data read section 152, and supplies the read general captured images captured from two viewpoints to the parallax information generation section 154.

The calibration data read section 152 reads calibration data for the plurality of focus positions from the storage section 14, and supplies the read calibration data to the interpolation section 153. Further, the calibration data read section 152 supplies the focus positions (the focus positions employed to capture the general captured images from two viewpoints) supplied from the read section 151 to the interpolation section 153.

The interpolation section 153 performs interpolation to generate calibration data for a focus position (a predetermined focus position) associated with the general captured images captured from two viewpoints, which are supplied from the calibration data read section 152, by using calibration data for a plurality of focus positions that is supplied from the calibration data read section 152, and supplies the generated calibration data to the parallax information generation section 154.

The parallax information generation section 154 generates (obtains) parallax information from the general captured images captured from two viewpoints, which are supplied from the read section 151, by using the calibration data for the focus position associated with the general captured images supplied from the interpolation section 153.

In the data processing section 15, the parallax information can be used to perform image processing, for example, for the purpose of refocusing with the general captured images from two viewpoints.

As regards the multi-lens camera 1 configured as described above, for example, a calibration mode for performing calibration is set as the operation mode of the multi-lens camera 1 after the multi-lens camera 1 is manufactured, and calibration is performed, for example, in a plant for manufacturing the multi-lens camera 1.

More specifically, as regards the multi-lens camera 1, control is exercised so as to set the focuses of the camera units $10_1$ and $10_2$ at a focus position for generating the calibration data (hereinafter referred to also as the standard focus position), and then an image of the calibration chart disposed at the standard focus position is captured. Then, in the multi-lens camera 1, the generation section 13 generates calibration data for the standard focus position from a calibration image obtained by capturing the image of the calibration chart, and causes the storage section 14 to store the generated calibration data. Calibration is performed on a plurality of standard focus positions. This results in the generation of calibration data for the plurality of standard focus positions.

When the multi-lens camera 1 is shipped from a manufacturing plant subsequently to calibration, a general imaging mode for performing general imaging is set as the operation mode of the multi-lens camera 1. In the general imaging mode, as is the case in the calibration mode, the storage section 12 associates the general captured images from two viewpoints (a general captured image captured from the viewpoint of the camera unit $10_1$ and a general captured image captured from the viewpoint of the camera unit $10_2$), which are captured by the camera units $10_1$ and $10_2$, with a focus position employed to capture the general captured images (hereinafter referred to also as the imaging focus position), and stores the resulting association.

In the multi-lens camera 1, the data processing section 15 performs interpolation to generate calibration data for the imaging focus position stored in the storage section 12 by using the calibration data for the plurality of standard focus positions, which is stored in the storage section 14. Further, the data processing section 15 uses the calibration data for the imaging focus position to generate parallax information from the general captured image captured from the viewpoint of the camera unit $10_1$ and the general captured image captured from the viewpoint of the camera unit $10_2$, which are associated with the imaging focus position. This results in the generation of accurate parallax information that is not significantly affected, for example, by lens distortion.

Figure 3:
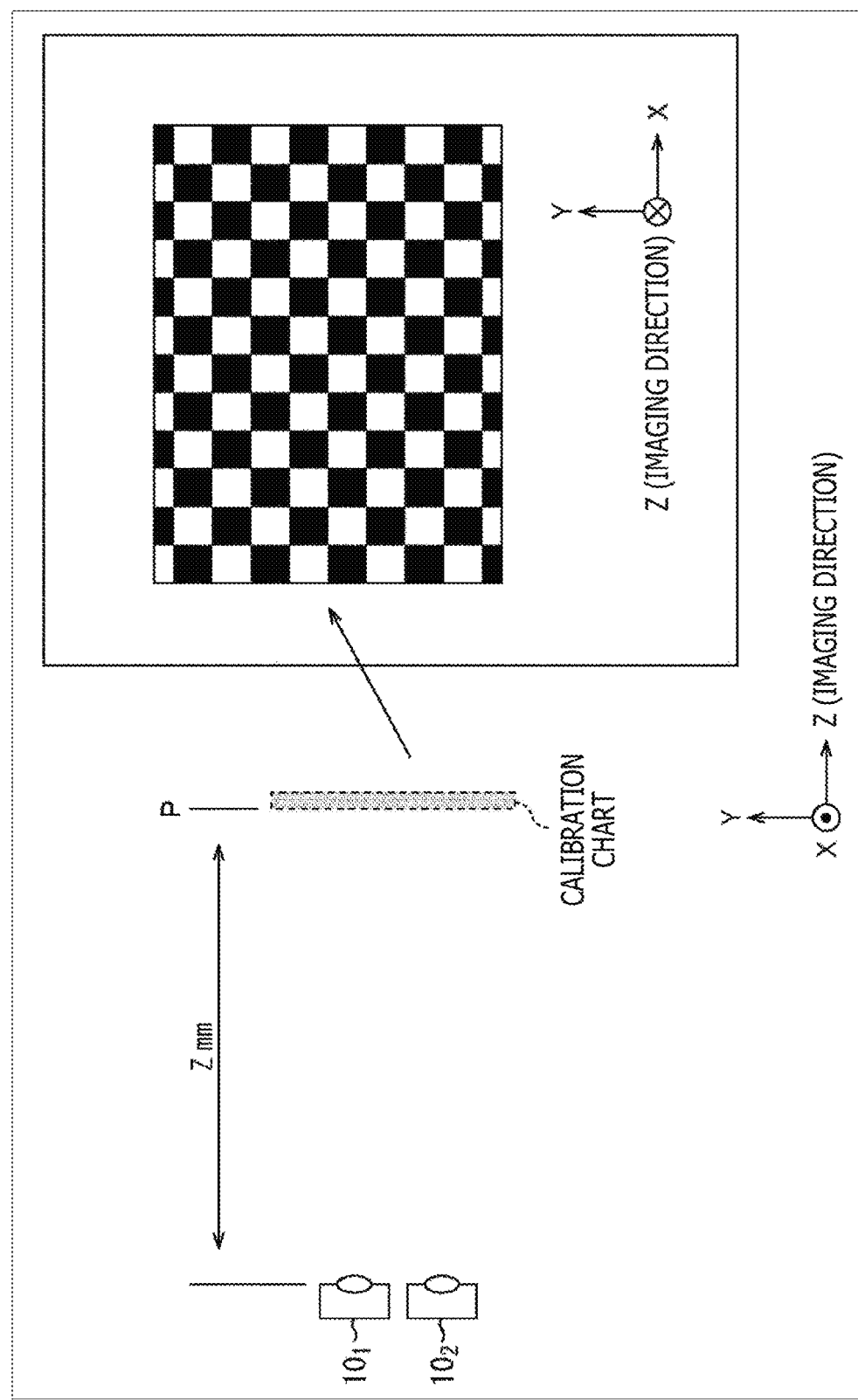
FIG. 3 is a diagram illustrating how calibration is performed in a multi-lens camera 1.

FIG. 3 is a diagram illustrating how calibration is performed in the multi-lens camera 1.

Here, it is assumed in the present document that the imaging direction of optical axis directions of the camera units $10_i$ (i=1, 2) is the Z-direction (axis), and that the left-to-right direction when the camera units $10_i$ face in the Z-direction is X-direction, and further that the bottom-to-top direction when the camera units $10_i$ face in the Z-direction is Y-direction.

In calibration, while a position P at a predetermined distance of Z mm from the camera units $10_1$ and $10_2$ is regarded as a standard focus position P, the multi-lens camera 1 (camera units $10_1$ and $10_2$) captures an image of the calibration chart disposed at the standard focus position P (or disposed within a depth of field of the camera units $10_1$ and $10_2$ controlled so as to focus at the standard focus position P).

The calibration chart depicted in FIG. 3 is an object on which, for example, a checkered pattern is drawn. However, any object having, for example, a known positional relationship may be used as the calibration chart.

In calibration, the calibration data for the standard focus position P is generated from a calibration image that is obtained by capturing an image of the calibration chart disposed at the standard focus position P.

The calibration image obtained by allowing the camera units $10_i$ to capture an image of the calibration chart suffers, for example, positional displacement (distortion) due, for instance, to lens distortion of the lenses $101_i$. More specifically, an actual position where an object is imaged within the calibration image does not coincide with a true position where the object should be imaged within the calibration image (the position where the object is imaged in a case where, for example, there is no lens distortion).

The calibration image is a captured image that is obtained by capturing an image of the calibration chart, which is a known object, when it is disposed at the focus position P, which is a known position. Therefore, the true position where the object should be imaged within the calibration image, that is, the true positions where various parts (e.g., lattice points) of the calibration chart should be imaged within the calibration image, can be predetermined by calculation.

Further, the actual position where the object is imaged within the calibration image can be determined from the calibration image.

From the calibration image, the generation section 13 determines the actual position where the object (e.g., each lattice point of the calibration chart) is imaged. The generation section 13 then generates, as the calibration data, information regarding the positional displacement between the actual position where the object is imaged and the true position where the same object should be imaged, which can be predetermined by calculation.

It should be noted that the technology described in NPL 1 generates internal and external parameters of a camera unit as the calibration data. As is the case with the technology described in NPL 1, the generation section 13 of the multi-lens camera 1 is able to generate internal and external parameters of the camera units $10_i$ as the calibration data. However, it is assumed here that the generated calibration data is the information regarding the positional displacement of the object in the calibration image obtained by allowing the camera units $10_i$ to capture an image of the calibration chart.

Figure 4A:
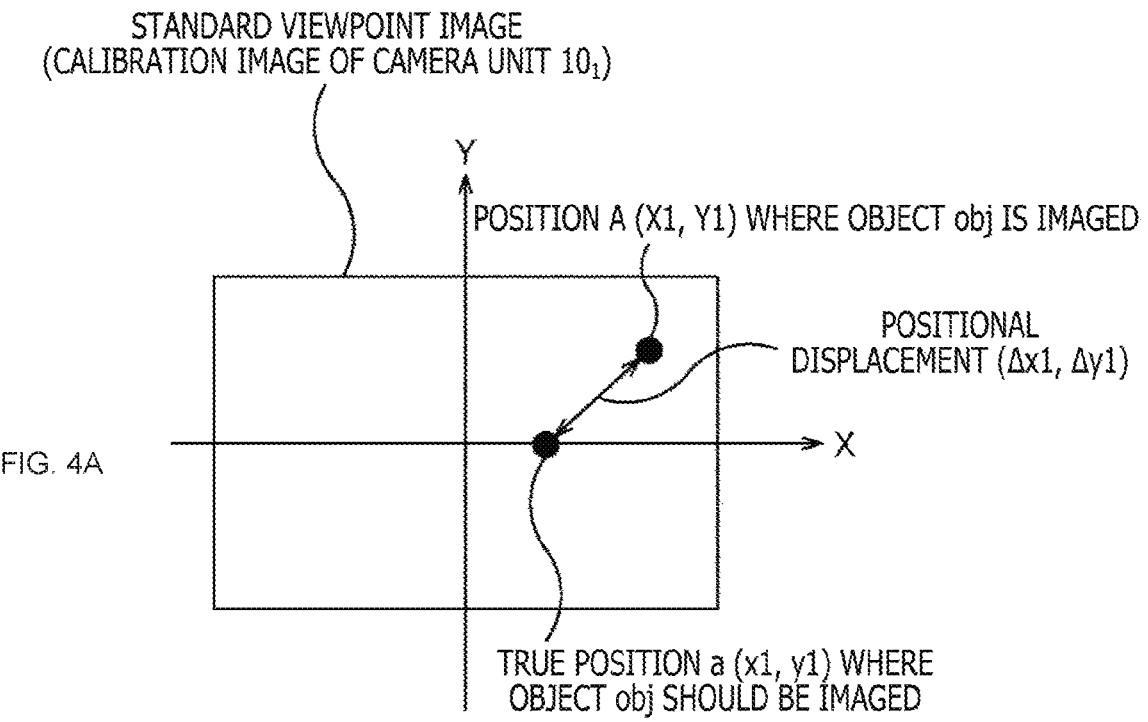
FIGS. 4A and 4B are set of diagrams illustrating calibration data.
Figure 4B:
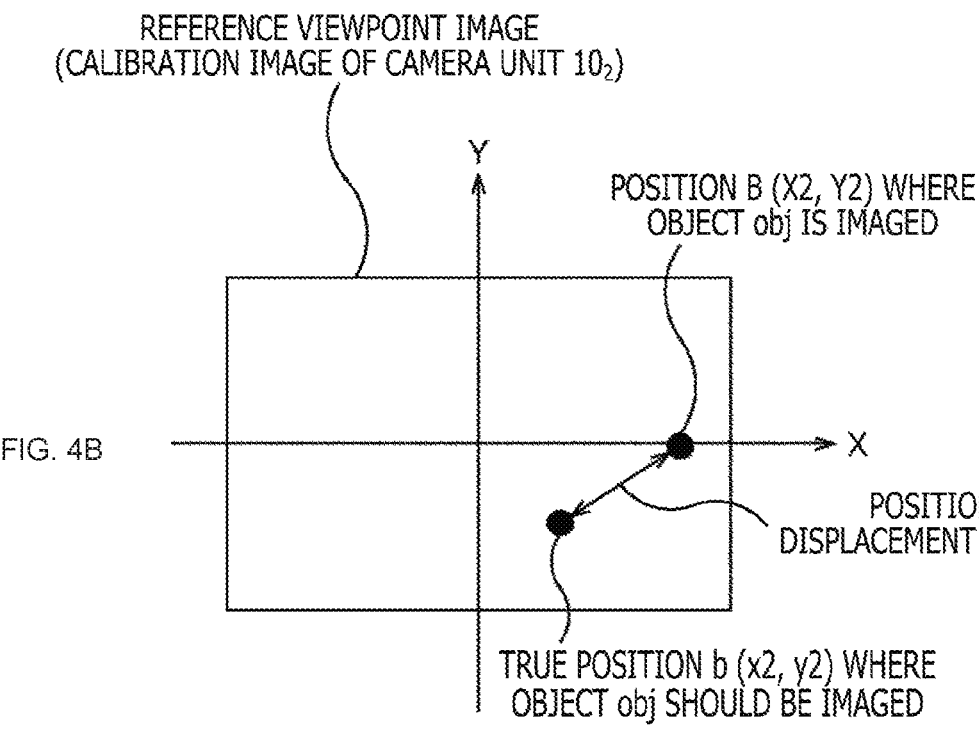

FIGS. 4A and 4B are set of diagrams illustrating the calibration data.

FIGS. 4A and 4B schematically depict calibration images from two viewpoints that are obtained when an image of the calibration chart is captured by the camera units 101 and 102 controlled so as to focus at the standard focus position.

It should be noted that one of the viewpoints of the camera units $10_1$ and $10_2$, for example, the viewpoint of the camera unit $10_1$, is referred to also as the standard viewpoint, and that the other viewpoint, that is, the viewpoint of the camera unit $10_2$, is referred to also as the reference viewpoint.

Further, a captured image captured from the standard viewpoint (the image captured by the camera unit $10_1$) is referred to also as a standard viewpoint image, and a captured image captured from the reference viewpoint (the image captured by the camera unit $10_2$) is referred to also as a reference viewpoint image. Parallax corresponding to the distance (baseline length) between the standard viewpoint and the reference viewpoint occurs between the standard viewpoint image and the reference viewpoint image.

Depicted in FIG. 4A is the standard viewpoint image, which is the calibration image captured by the camera unit 101. Depicted in FIG. 4B is the reference viewpoint image, which is the calibration image captured by the camera unit 102.

In the standard viewpoint image, the coordinates of a position (pixel) A where an object obj (e.g., one lattice point of the calibration chart) is imaged are expressed as (X1,Y1), and the coordinates of a true position (pixel) a where the object obj should be imaged is expressed as (x1,y1).

Further, in the reference viewpoint image, the coordinates of a position B where the same object obj is imaged, that is, the coordinates of the position (pixel) B corresponding to the position A (X1,Y1) are expressed as (X2,Y2), and the coordinates of a true position (pixel) b where the object obj should be imaged is expressed as (x2,y2).

It should be noted that the coordinates of a position in the standard viewpoint image are two-dimensional coordinates whose origin is at a predetermined point (e.g., the center of the standard viewpoint image) in the standard viewpoint image, and that the coordinates of a position in the reference viewpoint image are two-dimensional coordinates whose origin is the same as the origin of the standard viewpoint image.

In the standard viewpoint image, the positional displacement ($\Delta x1, \Delta y1$) between the position A (X1,Y1) where the object obj is imaged and the true position a (x1,y1) where the object obj should be imaged is expressed in Equation (1) below.

$$(\Delta x1, \Delta y1) = (X1,Y1) - (x1,y1) \quad (1)$$

In the reference viewpoint image, the positional displacement ($\Delta x2, \Delta y2$) between the position B (X2,Y2) where the object obj is imaged and the true position b (x2,y2) where the object obj should be imaged is expressed in Equation (2) below.

$$(\Delta x2, \Delta y2) = (X2,Y2) - (x2,y2) \quad (2)$$

Incidentally, in a case where the parallax information regarding an object obj imaged at the position A (X1,Y1) in the standard view point image is to be obtained by using the standard viewpoint image and the reference viewpoint image, the position B (X2,Y2), which represents a point within the reference viewpoint image that corresponds to the position A (X1,Y1), is determined by matching the reference viewpoint image against the standard viewpoint image.

Subsequently, the difference (X2,Y2)−(X1,Y1) between the position A (X1,Y1) where the object obj is imaged within the standard viewpoint image and a point in the reference viewpoint image that corresponds to the position A (X1,Y1), that is, the difference (X2,Y2)−(X1,Y1) between the position A (X1,Y1) and the position B (X2,Y2) where the object obj is imaged within the reference viewpoint image, is determined as the parallax information.

However, due, for instance, to lens distortion, the positions A (X1,Y1) and B (X2,Y2) where the object obj is imaged within the standard viewpoint image and the reference viewpoint image are respectively displaced from the true positions a (x1,y1) and b (x2,y2) where the object obj should be imaged within the standard viewpoint image and the reference viewpoint image.

As described above, the positions A (X1,Y1) and B (X2,Y2) where the object obj is actually imaged within the standard viewpoint image and the reference viewpoint image are respectively displaced from the true positions a (x1,y1) and b (x2,y2) where the object obj should be imaged within the standard viewpoint image and the reference viewpoint image. In some cases, therefore, accurate parallax information may not be represented by the difference (X2, Y2)−(X1, Y1) between the position A (X1,Y1) where the object obj is imaged within the standard viewpoint image and the position B (X2,Y2) where the object obj is imaged within the reference viewpoint image.

Here, the difference (X2,Y2)−(X1,Y1), which is the parallax information derived (merely) from the standard viewpoint image and the reference viewpoint image, is expressed in Equation (3) below, which is derived from Equation (3).

$$(X2, Y2) - (X1, Y1) = \{(x2, y2) + (\Delta x2, \Delta y2)\} - \{(x1, y1) + (\Delta x1, \Delta y1)\} \\ = \{(x2, y2) - (x1, y1)\} + \{(\Delta x2, \Delta y2) - (\Delta x1, \Delta x1, \Delta y1)\} \quad (3)$$

In Equation (3), (x2,y2)−(x1,y1) is the difference between the true position a (x1,y1) where the object obj should be imaged within the standard viewpoint image and a point in the reference viewpoint image that corresponds to the position a (x1,y1), that is, the difference between the true position a (x1,y1) and the true position b (x2,y2) where the object obj is imaged within the reference viewpoint image. Stated differently, (x2,y2)−(x1,y1) represents accurate parallax information that should be obtained regarding the object obj imaged at the position A.

According to Equation (3), the difference (X2,Y2)−(X1, Y1) representing the parallax information obtained from the standard viewpoint image and reference viewpoint image (only) contains an error, expressed as $(\Delta x2,\Delta y2)-(\Delta x1,\Delta y1)$, from the difference (x2,y2)−(x1,y1) representing the accurate parallax information. The error expressed as $(\Delta x2, \Delta y2)-(\Delta x1,\Delta y1)$ is a value associated with the positional displacements $(\Delta x2,\Delta y2)$ and $(\Delta x1,\Delta y1)$.

The difference (x2,y2)−(x1,y1) representing the accurate parallax information is expressed in Equation (4) below, which is derived from Equation (3).

$$(x2,y2)-(x1,y1)=\{(X2,Y2)-(X1,Y1)\}-\{(\Delta x2,\Delta y2)-(\Delta x1,\Delta y1)\} \quad (4)$$

According to Equation (4), when the positional displacements $(\Delta x1,\Delta y1)$ and $(\Delta x2,\Delta y2)$ of individual pixels in the standard viewpoint image and reference viewpoint image, which are calibration images captured respectively by the camera units $10_i$ in the multi-lens camera 1, are determined as calibration data, the accurate parallax information regarding the object obj, which is the difference (x2,y2)−(x1,y1)= {(X2,Y2)−(X1,Y1)}−{$(\Delta x2,\Delta y2)-(\Delta x1,\Delta y1)$}, can be obtained from the position A (X1,Y1) where the object obj of the standard viewpoint image is imaged and the point in the reference viewpoint image that corresponds to the position A (X1,Y1), that is, the position B (X2,Y2) where the object obj of the reference viewpoint image is imaged, by using the calibration data indicative of the positional displacements $(\Delta x1,\Delta y1)$ and $(\Delta x2,\Delta y2)$.

Accordingly, the generation section 13 generates, as the calibration data, the information regarding the positional displacements $(\Delta x1,\Delta y1)$ and $(\Delta x2,\Delta y2)$ of individual pixels in the standard viewpoint image and reference viewpoint image, which are the calibration images.

Stated differently, according to Equation (4), accurate parallax information can be obtained when the positional displacement $(\Delta x1,\Delta y1)$ of the standard viewpoint image and the positional displacement $(\Delta x2,\Delta y2)$ of the reference viewpoint image are respectively adopted as the calibration data.

Further, accurate parallax information can also be obtained even when the difference $(\Delta x2,\Delta y2)-(\Delta x1,\Delta y1)$ between the positional displacement $(\Delta x1,\Delta y1)$ of the standard viewpoint image and the positional displacement $(\Delta x2, \Delta y2)$ of the reference viewpoint image is adopted as the calibration data.

Accordingly, as the calibration data, the generation section 13 generates positional displacement information indicating the positional displacement $(\Delta x1,\Delta y1)$ of the standard viewpoint image and the positional displacement $(\Delta x2,\Delta y2)$ of the reference viewpoint image or generates the difference $(\Delta x2,\Delta y2)-(\Delta x1,\Delta y1)$ between the positional displacement $(\Delta x1,\Delta y1)$ of the standard viewpoint image and the positional displacement $(\Delta x2,\Delta y2)$ of the reference viewpoint image.

It should be noted that, in a case where the difference $(\Delta x2,\Delta y2)-(\Delta x1,\Delta y1)$ between the positional displacement $(\Delta x1,\Delta y1)$ of the standard viewpoint image and the positional displacement $(\Delta x2,\Delta y2)$ of the reference viewpoint image is adopted as the calibration data, the data amount of calibration data can be made smaller than in a case where the positional displacement $(\Delta x1,\Delta y1)$ of the standard viewpoint image and the positional displacement $(\Delta x2,\Delta y2)$ of the reference viewpoint image are respectively adopted as the calibration data.

The following description assumes, unless otherwise noted, that the generation section 13 generates, as the calibration data, the difference $(\Delta x2,\Delta y2)-(\Delta x1,\Delta y1)$ between the positional displacement $(\Delta x1,\Delta y1)$ of the calibration image obtained from the standard viewpoint (standard viewpoint image) and the positional displacement $(\Delta x2,\Delta y2)$ of the calibration image obtained from the reference viewpoint (reference viewpoint image), which is a viewpoint other than the standard viewpoint.

Here, in a case where the standard focus position at the time of calibration is coincident with the imaging focus position for general imaging, appropriate image processing can be performed on the general captured image by allowing the multi-lens camera 1 to perform image processing with the calibration data for the standard focus position.

Stated differently, accurate parallax information can be obtained as described above when the calibration data for the standard focus position coincident with the imaging focus position is used to generate parallax information regarding the standard viewpoint image and reference viewpoint image regarded as the general captured images.

Meanwhile, in a case where the standard focus position at the time of calibration is not coincident with the imaging focus position for general imaging, it is possible that inappropriate image processing may result when the multi-lens camera 1 performs image processing with the calibration data for the standard focus position.

Stated differently, in a case where the focus positions differ from each other, the lens conditions (lens states) of the camera units $10_i$ differ from each other. Therefore, even in the case of the same pixels in the general captured images, the (amount of) positional displacement varies from one focus position to another.

Consequently, if calibration data for the standard focus position not coincident with the imaging focus position is used to generate parallax information regarding the standard viewpoint image and reference viewpoint image regarded as the general captured images, accurate parallax information may not always be obtained due to inappropriate correction of parallax information error expressed as $(\Delta x2, \Delta y2)-(\Delta x1, \Delta y1)$, which is a value associated with the positional displacements $(\Delta x1, \Delta y1)$ and $(\Delta x2, \Delta y2)$ described in conjunction with Equation (3).

In order to perform appropriate image processing on the general captured images, that is, for example, obtain accurate parallax information, the multi-lens camera 1 captures images of calibration charts at a plurality of (different) standard focus positions to obtain calibration images, which are captured at the plurality of standard focus positions, and generates calibration data for the plurality of standard focus positions from the obtained calibration images.

Further, the multi-lens camera 1 performs interpolation to generate calibration data for the imaging focus position by using the calibration data for the plurality of standard focus positions, and uses the generated calibration data for the imaging focus position to perform image processing, for example, for the purpose of generating parallax information regarding the standard viewpoint image and reference viewpoint image regarded as the general captured images.

Figure 5:
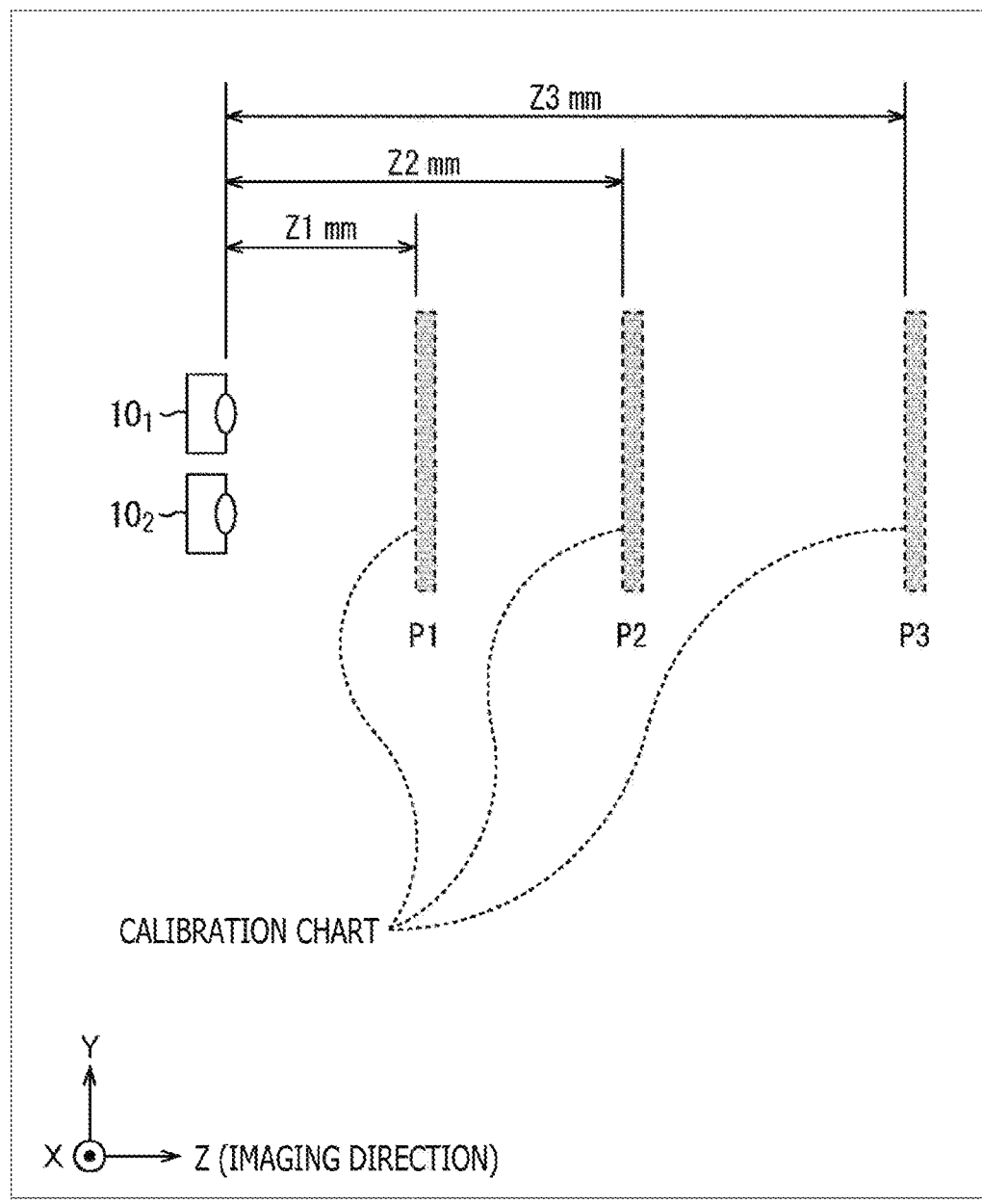
FIG. 5 is a diagram illustrating generation of calibration data for a plurality of standard focus positions.

FIG. 5 is a diagram illustrating the generation of the calibration data for a plurality of standard focus positions.

When the calibration data for a plurality of standard focus positions is to be generated, first of all, a position P1 at a predetermined distance of Z1 mm from the camera units $10_1$ and $10_2$ is regarded as the standard focus position P1, then the calibration chart is disposed at the standard focus position P1 (or disposed within the depth of field of the camera units $10_1$ and $10_2$ controlled so as to focus at the standard focus position P1), and an image of the calibration chart is captured by the multi-lens camera 1 (camera units $10_1$ and $10_2$).

Subsequently, a position P2 at a distance of Z2 mm from the camera units $10_1$ and $10_2$, which is different from the distance of Z1 mm, is regarded as the standard focus position P2, then the calibration chart is disposed at the standard focus position P2, and an image of the calibration chart is captured by the multi-lens camera 1.

Further, a position P3 at a distance of Z3 mm from the camera units $10_1$ and $10_2$, which is different from the distances of Z1 mm and Z2 mm, is regarded as the standard focus position P3, then the calibration chart is disposed at the standard focus position P3, and an image of the calibration chart is captured by the multi-lens camera 1.

It should be noted that the distances of Z1 mm, Z2 mm, and Z3 mm indicated in FIG. 5 are in the relation expressed by the relational expression Z1 mm<Z2 mm<Z3 mm.

The multi-lens camera 1 exercises control to set the focus positions of the camera units $10_i$ at the position P1, and captures an image of the calibration chart disposed at the position P1. This image capture results in the acquisition of the calibration image captured at the standard focus position P1 (the standard viewpoint image and reference viewpoint image as the calibration image), that is, the calibration image captured with the position P1 regarded as the standard focus position.

Similarly, the multi-lens camera 1 exercises control to set the camera units $10_i$ to focus at the position P2 and at the position P3, and captures an image of the calibration chart disposed at the position P2 and at the position P3. These image captures result in the acquisition of the calibration image at the standard focus position P2 and at the standard focus position P3 (the standard viewpoint image and reference viewpoint image as the calibration image), that is, the calibration image captured with the position P2 and the position P3 regarded as the standard focus positions.

It should be noted that the images of the calibration charts disposed at the standard focus positions P1, P2, and P3 may be captured in any appropriate order.

Further, three different positions P1, P2, and P3 are adopted here as the standard focus positions. Alternatively, however, two different positions or four or more different positions may be adopted as the standard focus positions, in addition to the three different positions.

As described above, the multi-lens camera 1 generates calibration data for a plurality of standard focus positions (standard focus positions P1, P2, and P3) from calibration images that are obtained by allowing the image of the calibration chart to be captured by the camera units $10_i$, which are controlled so as to focus at a plurality of positions (standard focus positions P1, P2, and P3).

Figure 6:
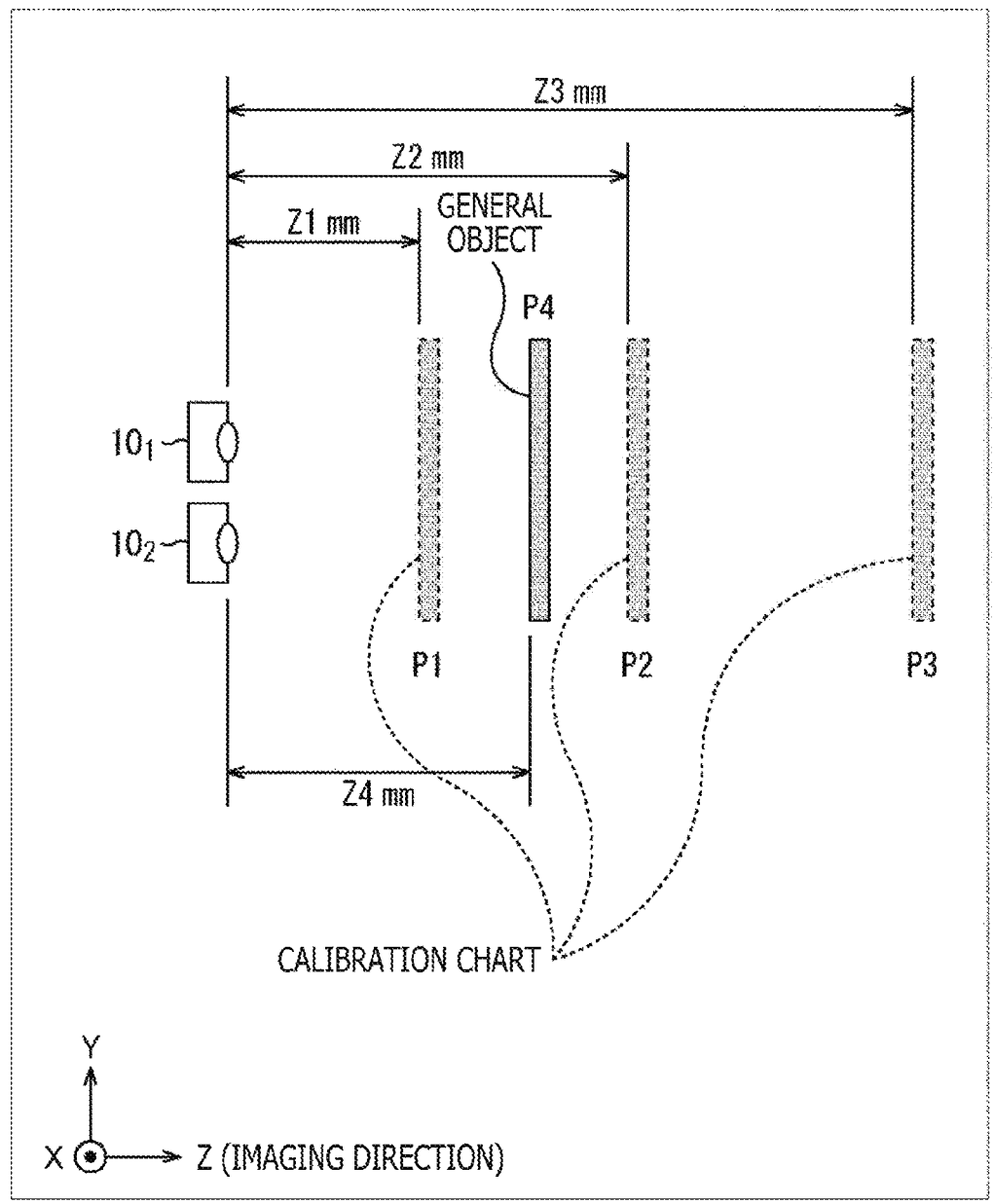
FIG. 6 is a diagram illustrating a general imaging operation performed in the multi-lens camera 1.

FIG. 6 is a diagram illustrating a general imaging operation performed in the multi-lens camera 1.

In the general imaging operation, the images of a general object existing at an imaging focus position P4 at a distance of Z4 mm from the camera units $10_1$ and $10_2$ are captured in the multi-lens camera 1 (the camera units $10_1$ and $10_2$).

It should be noted that the position P4 depicted in FIG. 6 is coincident with none of the positions P1, P2, and P3, more distant than the position P1, and nearer than the position P2.

The multi-lens camera 1 performs image processing on the general captured images that are obtained by capturing an image of an object with the camera units $10_i$ controlled so as to focus at the imaging focus position P4.

Here, if the multi-lens camera 1 performs image processing on the general captured image by using the calibration data for one of the plurality of standard focus positions in an as-is manner in a case where the imaging focus position at the time of general imaging is coincident with none of a plurality of standard focus positions at the time of calibration, it is possible that inappropriate image processing may result.

FIG. 6 indicates that the imaging focus position P4 is coincident with none of the standard focus positions P1, P2, and P3. Therefore, if the calibration data for one of the standard focus positions P1, P2, and P3 is used in an as-is manner to perform image processing on the general captured image captured by the camera units $10_1$ and $10_2$ controlled so as to focus at the imaging focus position P4, it is possible that inappropriate image processing may result.

Accordingly, in order to enable the multi-lens camera 1 to perform appropriate image processing on the general captured image, the interpolation section 153 performs interpolation to generate calibration data for the imaging focus position P4 by using the calibration data for the standard focus positions P1, P2, and P3.

FIG. 7 is a set of diagrams illustrating how interpolation is performed to generate the calibration data for the imaging focus position P4.

In FIG. 7, the vertical direction (vertical axis) represents the calibration data, that is, the difference $(\Delta x2, \Delta y2)-(\Delta x1, \Delta y1)$ (hereinafter referred to also as the positional displacement difference) between the positional displacement $(\Delta x1, \Delta y1)$ of the standard viewpoint image and the positional displacement $(\Delta x2, \Delta y2)$ of the reference viewpoint image, and the horizontal direction (horizontal axis) represents the focus positions.

In FIG. 7, a circle is used to mark the calibration data for each of the standard focus positions P1, P2, and P3, that is, for example, the difference (Δx2,Δy2)−(Δx1,Δy1) (positional displacement difference) between the positional displacement (Δx1,Δy1) of a position A (X1,Y1) in the standard viewpoint image used as a calibration image and the positional displacement (Δx2,Δy2) of a point corresponding to the position A, that is, a position B (X2,Y2) in the reference viewpoint image used as a calibration image.

The interpolation section 153 performs linear or other interpolation to generate calibration data for the imaging focus position P4 (a portion marked by a triangle in FIG. 7) by using the calibration data for at least two of the standard focus positions P1, P2, and P3.

As described above, the multi-lens camera 1 performs interpolation to generate the calibration data for the imaging focus position P4 by using the calibration data for the plurality of standard focus positions P1, P2, and P3.

Consequently, it is possible to perform appropriate image processing on the general captured image captured at the imaging focus position P4 by using the calibration data for the imaging focus position P4.

It should be noted that the tendency of change in the distortion of a captured image (the positional displacement of an object in the captured image) with respect to the direction of a focus position varies with lens design. Therefore, in a case where the tendency of change in the distortion of the captured image with respect to the direction of a focus position is obvious from the lens design, it is possible to determine, from the tendency of change in the distortion of the captured image with respect to the direction of a focus position, for example, the standard focus positions for calibration data to be generated at the time of calibration (the positions where the calibration chart is disposed), the number (concentration) of standard focus positions, the number of calibration data for the standard focus positions used for generating the calibration data for the imaging focus position, and the method of interpolation (an interpolation curve to be used for interpolation).

Figure 8:
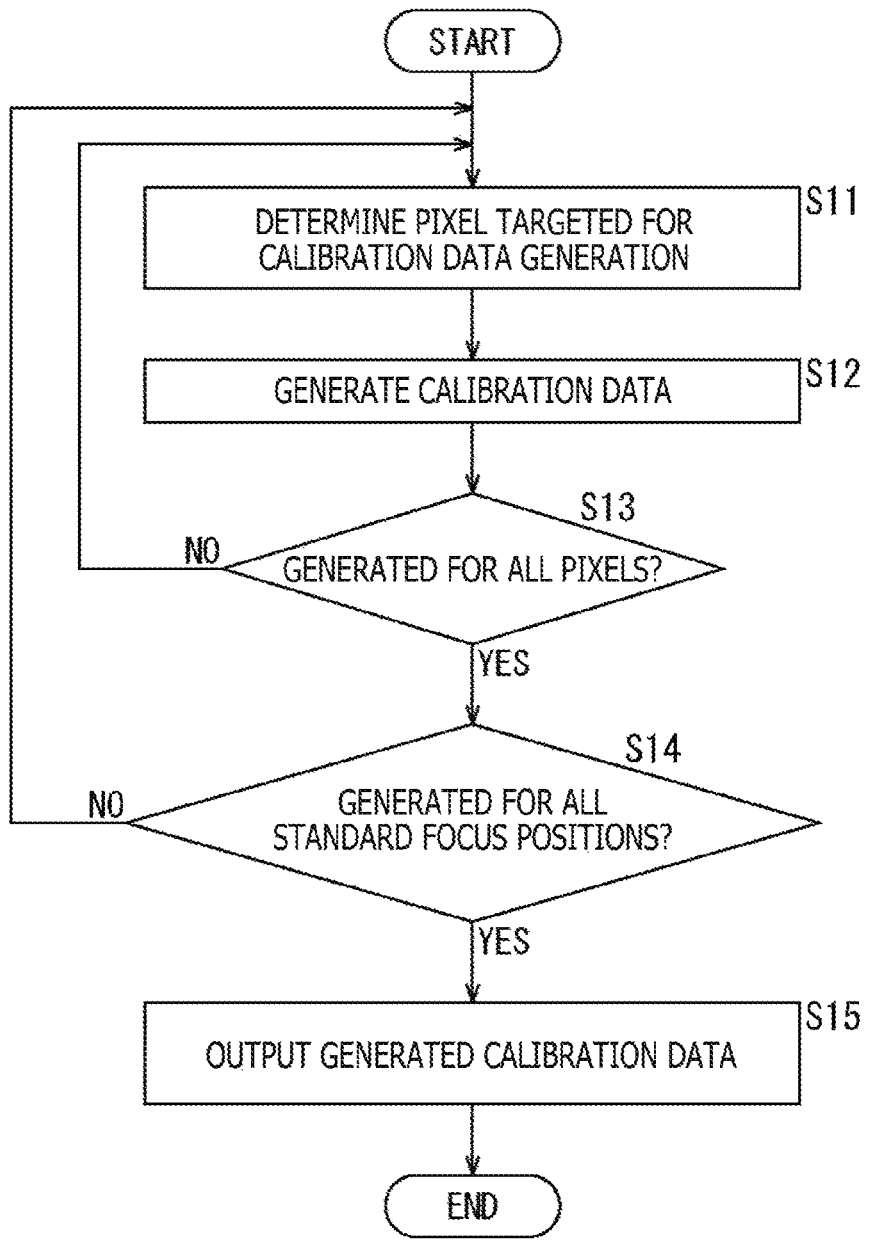
FIG. 8 is a flowchart illustrating an example of a process of generating calibration data for a plurality of standard focus positions.

FIG. 8 is a flowchart illustrating an example of a process of generating calibration data for a plurality of standard focus positions from calibration images captured at the plurality of standard focus positions.

In step S11, the generation section 13 selects a standard focus position not determined as a standard focus position targeted for calibration data generation (hereinafter referred to as a target focus position) from a plurality of standard focus positions associated with calibration images stored in the storage section 12, and determines the selected standard focus position as a target focus position.

Subsequently, the generation section 13 selects one of pixels not determined as a pixel targeted for calibration data generation (hereinafter referred to as a target pixel) from, for example, the pixels in the standard viewpoint image, which is one of the standard viewpoint image and reference viewpoint image regarded as the calibration images captured at the target focus position, and determines the selected pixel as the target pixel. Processing then proceeds from step S11 to step S12.

In step S12, the generation section 13 generates calibration data for the target pixel in a calibration image captured at the target focus position by using the calibration images captured at the target focus position (the standard viewpoint image and reference viewpoint image regarded as the calibration images), which are among the calibration images captured at a plurality of focus positions stored in the storage section 12. Processing then proceeds to step S13.

In step S13, the generation section 13 determines whether the calibration data is generated for all pixels in the calibration image captured at the target focus position.

In a case where it is determined in step S13 that the calibration data is still not generated for all pixels in the calibration image captured at the target focus position, processing returns to step S11 so that the generation section 13 determines a new target pixel by selecting it from the pixels in the calibration image captured at the target focus position. Processing then proceeds from step S11 to step S12 so as to repeatedly perform processing in a similar manner.

Meanwhile, in a case where it is determined in step S13 that the calibration data is generated for all pixels in the calibration image captured at the target focus position, processing proceeds to step S14.

In step S14, the generation section 13 determines whether the calibration data is generated for all of the plurality of standard focus positions.

In a case where it is determined in step S14 that the calibration data is still not generated for all of the plurality of standard focus positions, processing returns to step S11 so that the generation section 13 determines a new target focus position by selecting it from the plurality of standard focus positions. Further, the generation section 13 selects one of pixels not determined as a target pixel from the pixels in the calibration image (standard viewpoint image) captured at the new target focus position, and determines the selected pixel as the target pixel. Processing then proceeds from step S11 to step S12 so as to repeatedly perform processing in a similar manner.

Meanwhile, in a case where it is determined in step S14 that the calibration data is generated for all of the plurality of standard focus positions, processing proceeds to step S15.

In step S15, the generation section 13 outputs the calibration data for the plurality of standard focus positions to the storage section 14 for storage purposes. Upon completion of step S15, processing terminates.

FIG. 9 is a flowchart illustrating an example of a process of generating calibration data for the imaging focus position by using the calibration data for the plurality of standard focus positions.

In step S21, the read section 151 in the data processing section 15 (FIG. 2) reads the imaging focus position associated with a general captured image from the storage section 12 (FIG. 1), and supplies the read imaging focus position to the calibration data read section 152.

Further, in step S21, the calibration data read section 152 reads the calibration data for a plurality of standard focus positions from the storage section 14 (FIG. 1), and supplies the read calibration data and the imaging focus position received from the read section 151 to the interpolation section 153. Processing then proceeds to step S22.

In step S22, the interpolation section 153 determines whether the imaging focus position supplied from the calibration data read section 152 is coincident with one of the plurality of standard focus positions whose calibration data is similarly supplied from the calibration data read section 152 (generated by the generation section 13).

In a case where it is determined in step S22 that the imaging focus position is coincident with one of the plurality of standard focus positions, processing proceeds to step S23.

In step S23, the interpolation section 153 selects calibration data for a standard focus position coincident with the imaging focus position, which is among the calibration data for the plurality of standard focus positions supplied from the calibration data read section 152, as the calibration data for the imaging focus position, and outputs the selected calibration data for the imaging focus position to the parallax information generation section 154. Upon completion of step S23, processing terminates.

Meanwhile, in a case where it is determined in step S22 that the imaging focus position is coincident with none of the plurality of standard focus positions, processing proceeds to step S24.

In step S24, the interpolation section 153 selects one of pixels that is in a general captured image (e.g., a standard viewpoint image) captured at the imaging focus position and not determined as the target pixel for calibration data generation, and determines the selected pixel as the target pixel. Processing then proceeds to step S25.

In step S25, the interpolation section 153 performs interpolation to generate the calibration data for the target pixel in the general captured image captured at the imaging focus position (performs interpolation with respect to the direction of the focus position) by using the calibration data for the plurality of standard focus positions supplied from the calibration data read section 152. Processing then proceeds to step S26.

In step S26, the interpolation section 153 determines whether the calibration data is generated (by interpolation) for all pixels in the general captured image captured at the imaging focus position.

In a case where it is determined in step S26 that the calibration data is still not generated for all pixels in the general captured image captured at the imaging focus position, processing returns to step S24 so that the interpolation section 153 determines a new target pixel by selecting it from the pixels in the general captured image captured at the imaging focus position. Processing then proceeds from step S24 to step S25 so as to repeatedly perform processing in a similar manner.

Meanwhile, in a case where it is determined in step S26 that the calibration data is generated for all pixels in the general captured image captured at the imaging focus position, processing proceeds to step S27.

In step S27, the interpolation section 153 outputs the calibration data for the imaging focus position to the parallax information generation section 154. Upon completion of step S27, processing terminates.

As described above, the multi-lens camera 1 is capable of performing interpolation to generate calibration data for a predetermined focus position that is different from a plurality of standard focus positions at the time of calibration.

Consequently, the multi-lens camera 1 is able to perform appropriate image processing on a general captured image captured at the predetermined focus position by using the calibration data for the predetermined focus position different from the plurality of standard focus positions.

As a result, when generating the parallax information, the multi-lens camera 1 is able to provide improved robustness against focus position changes.

Stated differently, the multi-lens camera 1 is able to perform interpolation to generate calibration data for a predetermined focus position that is different from a plurality of standard focus positions. Therefore, accurate parallax information can be generated under the lens conditions (lens states) of the camera units $10_i$ when they are controlled so as to focus at the predetermined focus position (imaging focus position) different from the standard focus positions.

Further, as the multi-lens camera 1 is able to generate accurate parallax information, refocusing or other image processing can be appropriately performed on a general captured image by making use of the generated parallax information no matter whether the imaging focus position is at a short distance as at the time of macro photography or at a long distance as at the time of non-macro photography.

It should be noted that, in a case where, for example, the imaging focus position of one of a plurality of camera units $10_i$ is different from the imaging focus position of another camera unit, the multi-lens camera 1 is able to use the camera control section 11 in order to recognize the different imaging focus position of the affected camera unit and use the interpolation section 153 in order to generate calibration data for the different imaging focus position.

Further, the calibration depicted in FIG. 8 is performed to generate calibration data for all pixels in the standard viewpoint image that is regarded as the calibration image captured at the standard focus position. Alternatively, however, the calibration data for the standard focus position may be generated only for a plurality of specified pixels in the standard viewpoint image instead of all pixels in the standard viewpoint image.

In the above case, the data amount of calibration data for a plurality of standard focus positions is reduced. This makes it possible to reduce the storage capacity of the storage section 14 that stores the calibration data for the plurality of standard focus positions. Additionally, this makes it possible to reduce the processing load for generating calibration data for the standard focus positions.

In a case where the calibration data for the standard focus position is to be generated only for a plurality of specified pixels (hereinafter referred to also as the specified pixels) in the standard viewpoint image instead of all pixels in the standard viewpoint image, the multi-lens camera 1 generates calibration data by performing interpolation with respect to the spatial directions (X-axis direction and Y-axis direction) of the standard viewpoint image with respect to pixels other than the specified pixels in the standard viewpoint image (hereinafter referred to also as the unspecified pixels) by using the calibration data for the specified pixels.

Figure 10:
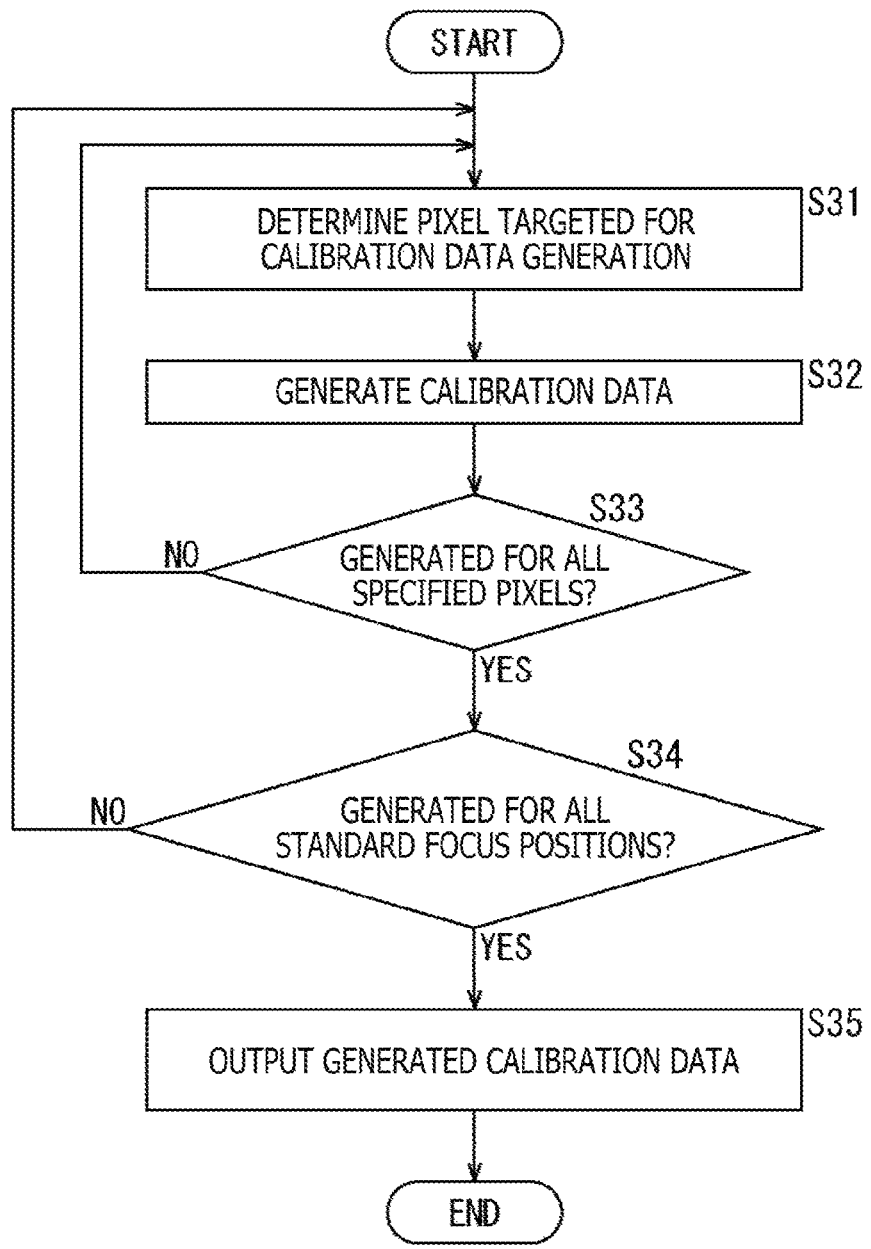
FIG. 10 is a flowchart illustrating another example of a process of generating calibration data for a plurality of standard focus positions.

FIG. 10 is a flowchart illustrating another example of the process of generating calibration data for a plurality of standard focus positions from calibration images captured at the plurality of standard focus positions.

In step S31, the generation section 13 selects a standard focus position not determined as the target focus position for calibration data generation from a plurality of standard focus positions associated with calibration images stored in the storage section 12, and determines the selected standard focus position as the target focus position.

Subsequently, the generation section 13 selects one of specified pixels not determined as a target pixel targeted for calibration data generation from, for example, the specified pixels in the standard viewpoint image, which is one of the standard viewpoint image and reference viewpoint image regarded as the calibration images captured at the target focus position, and determines the selected pixel as the target pixel. Processing then proceeds to step S32.

In step S32, the generation section 13 generates calibration data for the target pixel in a calibration image captured at the target focus position by using the standard viewpoint image and reference viewpoint image regarded as the calibration images captured at the target focus position, which are among the calibration images captured at a plurality of focus positions stored in the storage section 12. Processing then proceeds to step S33.

In step S33, the generation section 13 determines whether the calibration data is generated for all specified pixels in the calibration image captured at the target focus position.

In a case where it is determined in step S33 that the calibration data is still not generated for all specified pixels in the calibration image captured at the target focus position, processing returns to step S31 so that the generation section 13 determines a new target pixel by selecting it from the specified pixels in the calibration image captured at the target focus position. Processing then proceeds from step S31 to step S32 so as to repeatedly perform processing in a similar manner.

Meanwhile, in a case where it is determined in step S33 that the calibration data is generated for all specified pixels in the calibration image captured at the target focus position, processing proceeds to step S34.

In step S34, the generation section 13 determines whether the calibration data is generated for all of the plurality of standard focus positions.

In a case where it is determined in step S34 that the calibration data is still not generated for all of the plurality of standard focus positions, processing returns to step S31 so that the generation section 13 determines a new target focus position by selecting it from the plurality of standard focus positions. Further, the generation section 13 selects one of specified pixels not determined as a target pixel from the specified pixels in the calibration image (standard viewpoint image) captured at the new target focus position, and determines the selected pixel as the target pixel. Processing then proceeds from step S31 to step S32 so as to repeatedly perform processing in a similar manner.

Meanwhile, in a case where it is determined in step S34 that the calibration data is generated for all of the plurality of standard focus positions, processing proceeds to step S35.

In step S35, as the calibration data for the plurality of standard focus positions, the generation section 13 outputs the calibration data for only the specified pixels corresponding to the plurality of standard focus positions to the storage section 14 for storage purposes. Upon completion of step S35, processing terminates.

Figure 11:
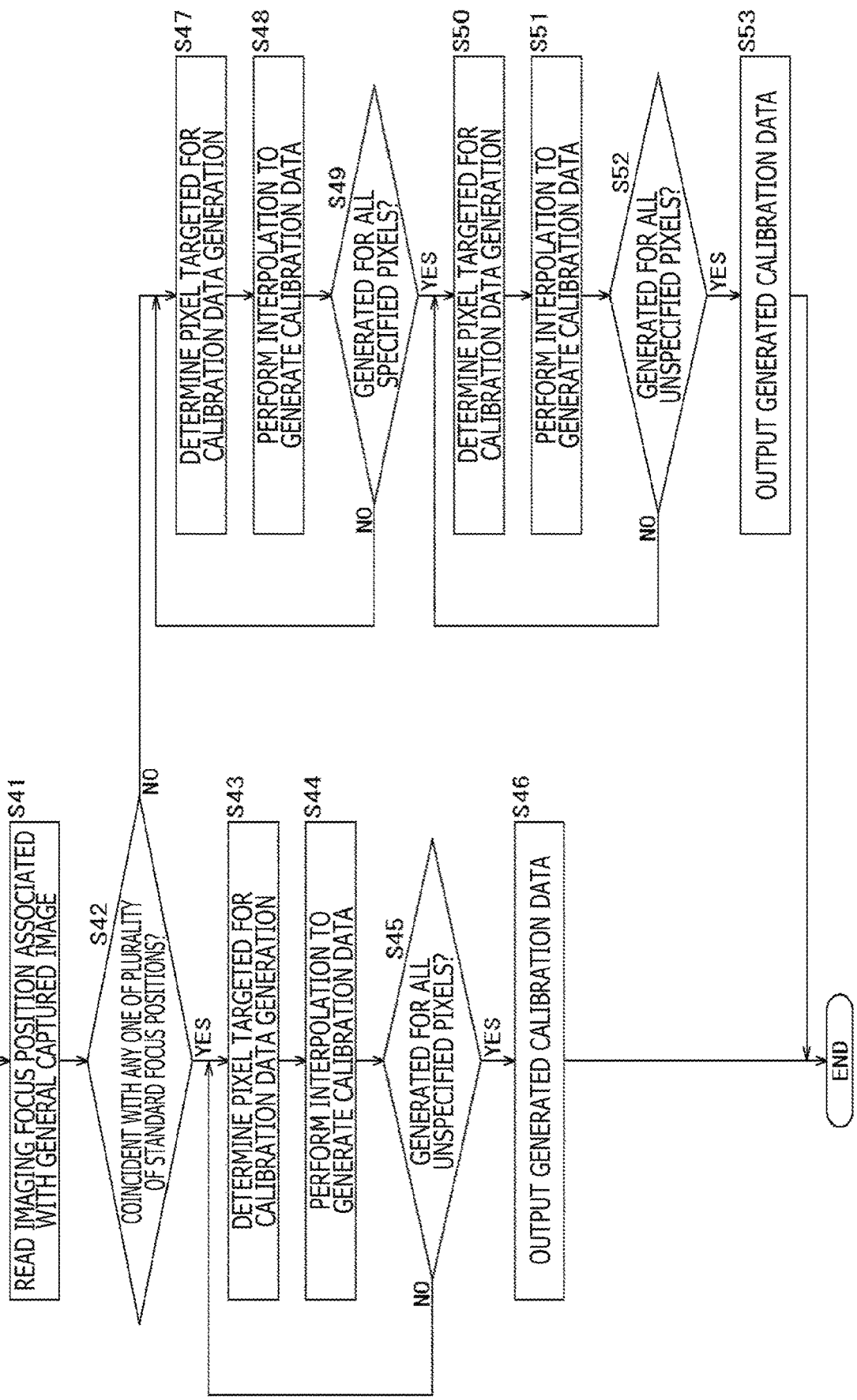
FIG. 11 is a flowchart illustrating another example of a process of generating calibration data for the imaging focus position.

FIG. 11 is a flowchart illustrating an example of the process of generating calibration data for the imaging focus position by using the calibration data for the plurality of standard focus positions.

Stated differently, FIG. 11 is a flowchart illustrating an example of the process of generating calibration data for the imaging focus position by using the calibration data that is generated for only the specified pixels corresponding to the plurality of standard focus positions as described with reference to FIG. 10.

In step S41, the read section 151 in the data processing section 15 (FIG. 2) reads the imaging focus position associated with a general captured image from the storage section 12 (FIG. 1), and supplies the read imaging focus position to the calibration data read section 152.

Further, in step S41, the calibration data read section 152 reads the calibration data for a plurality of standard focus positions from the storage section 12 (FIG. 1), and supplies the read calibration data and the imaging focus position received from the read section 151 to the interpolation section 153. Processing then proceeds to step S42.

In step S42, the interpolation section 153 determines whether the imaging focus position supplied from the calibration data read section 152 is coincident with one of the plurality of standard focus positions whose calibration data is similarly supplied from the calibration data read section 152 (generated by the generation section 13).

In a case where it is determined in step S42 that the imaging focus position is coincident with one of the plurality of standard focus positions, processing proceeds to step S43.

In step S43, the interpolation section 153 selects calibration data for a standard focus position coincident with the imaging focus position, which is among the calibration data for the plurality of standard focus positions supplied from the calibration data read section 152, as the calibration data for the specified pixels corresponding to the imaging focus position.

Further, in step S43, the interpolation section 153 selects one of unspecified pixels not determined as a target pixel for calibration data generation from unspecified pixels in a general captured image (e.g., a standard viewpoint image) captured at the imaging focus position, and determines the selected unspecified pixel as the target pixel. Processing then proceeds to step S44.

In step S44, the interpolation section 153 performs interpolation (with respect to the spatial directions) to generate calibration data for the target pixel (unspecified pixel) in the imaging focus position by using the calibration data for the specified pixels corresponding to the imaging focus position. Processing then proceeds to step S45.

In step S45, the interpolation section 153 determines whether the calibration data is generated (by interpolation) for all unspecified pixels in the general captured image captured at the imaging focus position.

In a case where it is determined in step S45 that the calibration data is not generated for all unspecified pixels in the general captured image captured at the imaging focus position, processing returns to step S43 so that the interpolation section 153 determines a new target pixel. Processing then proceeds from step S43 to step S44 so as to repeatedly perform processing in a similar manner.

Meanwhile, in a case where it is determined in step S45 that the calibration data is generated for all unspecified pixels in the general captured image captured at the imaging focus position, processing proceeds to step S46.

In step S46, the interpolation section 153 outputs the calibration data for specified pixels corresponding to the imaging focus position and the calibration data for unspecified pixels corresponding to the imaging focus position, as the calibration data for the imaging focus position, to the parallax information generation section 154. Upon completion of step S46, processing terminates.

Meanwhile, in a case where it is determined in step S42 that the imaging focus position is coincident with none of the plurality of standard focus positions, processing proceeds to step S47.

In step S47, the interpolation section 153 selects one of specified pixels not determined as a target pixel for calibration data generation from specified pixels in a general captured image (e.g., a standard viewpoint image) captured at the imaging focus position, and determines the selected specified pixel as the target pixel. Processing then proceeds to step S48.

In step S48, the interpolation section 153 performs interpolation (with respect to the direction of the focus position) to generate calibration data for the target pixel (specified pixel) in the general captured image captured at the imaging focus position by using the calibration data for the plurality of standard focus positions supplied from the calibration data read section 152. Processing then proceeds to step S49.

In step S49, the interpolation section 153 determines whether the calibration data is generated (by interpolation) for all specified pixels in the general captured image captured at the imaging focus position.

In a case where it is determined in step S49 that the calibration data is not generated for all specified pixels in the general captured image captured at the imaging focus position, processing returns to step S47 so that the interpolation section 153 determines a new target pixel by selecting it from specified pixels in the general captured image captured at the imaging focus position. Processing then proceeds from step S47 to step S48 so as to repeatedly perform processing in a similar manner.

Meanwhile, in a case where it is determined in step S49 that the calibration data is generated for all specified pixels in the general captured image captured at the imaging focus position, processing proceeds to step S50.

In step S50, the interpolation section 153 selects one of unspecified pixels not determined as a target pixel for calibration data generation from unspecified pixels in a general captured image (e.g., a standard viewpoint image) captured at the imaging focus position, and determines the selected unspecified pixel as the target pixel. Processing then proceeds to step S51.

In step S51, the interpolation section 153 performs interpolation (with respect to the spatial directions) to generate calibration data for the target pixel (unspecified pixel) at the imaging focus position by using the calibration data for the specified pixels corresponding to the imaging focus position. Processing then proceeds to step S52.

In step S52, the interpolation section 153 determines whether the calibration data is generated (by interpolation) for all unspecified pixels in the general captured image captured at the imaging focus position.

In a case where it is determined in step S52 that the calibration data is not generated for all unspecified pixels in the general captured image captured at the imaging focus position, processing returns to step S50 so that the interpolation section 153 determines a new target pixel by selecting it from the unspecified pixels in the general captured image captured at the imaging focus position. Processing then proceeds from step S50 to step S51 so as to repeatedly perform processing in a similar manner.

Meanwhile, in a case where it is determined in step S52 that the calibration data is generated for all unspecified pixels in the general captured image captured at the imaging focus position, processing proceeds to step S53.

In step S53, the interpolation section 153 outputs the calibration data for specified pixels corresponding to the imaging focus position and the calibration data for unspecified pixels corresponding to the imaging focus position, as the calibration data for the imaging focus position, to the parallax information generation section 154. Upon completion of step S53, processing terminates.

As described above, at the time of calibration, the generation section 13 of the multi-lens camera 1 is able to generate calibration data for only a plurality of specified pixels instead of all pixels in the standard viewpoint image, as the calibration data for the standard focus position, and store the generated calibration data in the storage section 14.

Consequently, the multi-lens camera 1 is able to reduce the storage capacity of the storage section 14 that stores the calibration data for the plurality of standard focus positions. Further, the multi-lens camera 1 is able to reduce the processing load for generating calibration data for the standard focus positions.

As described above, in a case where general imaging is performed, the multi-lens camera 1 is able to store a general captured image acquired by general imaging in association with the imaging focus position and perform interpolation to generate calibration data for the imaging focus position by using calibration data for a plurality of standard focus positions.

Additionally, in a case where the multi-lens camera 1 is configured such that, for example, the lenses $101_1$ and $101_2$ each include a zoom lens, and that the camera units $10_1$ and $10_2$ are able to perform a general imaging operation at various zoom magnification settings (angles of view), the interpolation section 153 is able to perform interpolation to generate calibration data for a combination of a focus position for general imaging (imaging focus position) and a zoom magnification by using the calibration data generated at the time of calibration.

In a case where calibration data for a combination of a focus position for general imaging and a zoom magnification (calibration data conforming to the lens conditions of the camera units $10_1$ and $10_2$ at the time of general imaging) is to be generated by interpolation, the multi-lens camera 1 stores the imaging focus position and the zoom magnification for general imaging in association with a general captured image. Further, for purposes of calibration, the multi-lens camera 1 generates calibration data for the combinations of a plurality of different focus positions and a plurality of different zoom magnifications.

Here, in the multi-lens camera 1 (FIG. 1), the camera control section 11 is able to recognize the focus position and zoom magnification of each of the camera units $10_1$ and $10_2$, and the storage section 12 is able to store the association between the focus position and zoom magnification recognized by the camera control section 11 and a captured image captured by each of the camera units $10_1$ and $10_2$. Then, the generation section 13 (FIG. 1) is able to generate calibration data for the combinations of the plurality of different focus positions and the plurality of different zoom magnifications from calibration images captured at the plurality of different focus positions and the plurality of different zoom magnifications that are obtained by capturing an image of the calibration chart at the plurality of different zoom magnifications at the plurality of different focus positions.

Consequently, the interpolation section 153 (FIG. 2) included in the multi-lens camera 1 is able to perform interpolation to generate calibration data for a combination of a predetermined focus position and a predetermined zoom magnification by using the calibration data for the combinations of the plurality of different focus positions and the plurality of different zoom magnifications that is generated by the generation section 13.

FIG. 12 is a set of diagrams illustrating how interpolation is performed to generate calibration data for the combination of a predetermined focus position and a predetermined zoom magnification.

It should be noted that the zoom magnification at the time of calibration is hereinafter referred to also as the standard zoom magnification, and that the zoom magnification at the time of general imaging is hereinafter referred to also as the imaging zoom magnification.

In FIG. 12, the vertical direction (vertical axis) represents calibration data, that is, the difference $(\Delta x2, \Delta y2)-(\Delta x1, \Delta y1)$ (positional displacement difference) between the positional displacement $(\Delta x1, \Delta y1)$ of the standard viewpoint image and the positional displacement $(\Delta x2, \Delta y2)$ of the reference viewpoint image, and the horizontal direction (horizontal axis) represents focus positions. Further, the depth direction in FIG. 12 represents zoom magnifications.

In calibration, images of calibration charts respectively disposed, for example, at positions P1, P2, and P3 are captured at each of a plurality of different zoom magnifications ZM1, ZM2, and ZM3 to obtain calibration images. Then, calibration data for combinations of different standard focus positions P1, P2, and P3 and different standard zoom magnifications ZM1, ZM2, and ZM3 is generated from the obtained calibration images derived from the combinations of different standard focus positions P1, P2, and P3 and different standard zoom magnifications ZM1, ZM2, and ZM3.

In FIG. 12, a circle is used to mark the calibration data (positional displacement difference) for the combinations of different standard focus positions P1, P2, and P3 and different standard zoom magnifications ZM1, ZM2, and ZM3.

In a case where general imaging is performed in the multi-lens camera 1 while the camera units $10_1$ and $10_2$ are controlled so as to focus at the imaging focus position P4 and zoom at an imaging zoom magnification ZM4, interpolation is performed (with respect to the direction of focus position and the direction of zoom magnification) to generate calibration data for a combination of the imaging focus position P4 and the imaging zoom magnification ZM4 by using the calibration data for the combinations of different standard focus positions P1, P2, and P3 and different standard zoom magnifications ZM1, ZM2, and ZM3.

Stated differently, the interpolation section 153 performs interpolation to generate calibration data (marked by a triangle in FIG. 12) for a combination of the imaging focus position P4 (predetermined focus position) and the imaging zoom magnification ZM4 (predetermined zoom magnification) by using the calibration data for at least three combinations, for example, of nonlinearly arranged different standard focus positions and different standard zoom magnifications, which is among the calibration data for the combinations of different standard focus positions P1, P2, and P3 and different standard zoom magnifications ZM1, ZM2, and ZM3.

As described above, for purposes of calibration, the multi-lens camera 1 is able to generate calibration data for the combinations of a plurality of different standard focus positions and a plurality of different standard zoom magnifications.

Further, when general imaging is performed with the camera units $10_1$ and $10_2$ set at a predetermined focus position and at a predetermined zoom magnification, the multi-lens camera 1 is able to perform interpolation by using calibration data generated at the time of calibration in order to generate calibration data conforming to the lens conditions (lens states) of the camera units $10_1$ and $10_2$ at the time of general imaging, that is, the calibration data for the combination of the predetermined focus position and the predetermined zoom magnification.

Consequently, by using the calibration data for the combination of a predetermined focus position and a predetermined zoom magnification, the multi-lens camera 1 is able to perform appropriate image processing on a general captured image derived from the combination of the predetermined focus position and the predetermined zoom magnification.

Second Embodiment of Multi-Lens Camera to which Present Technology is Applied

Figure 13:
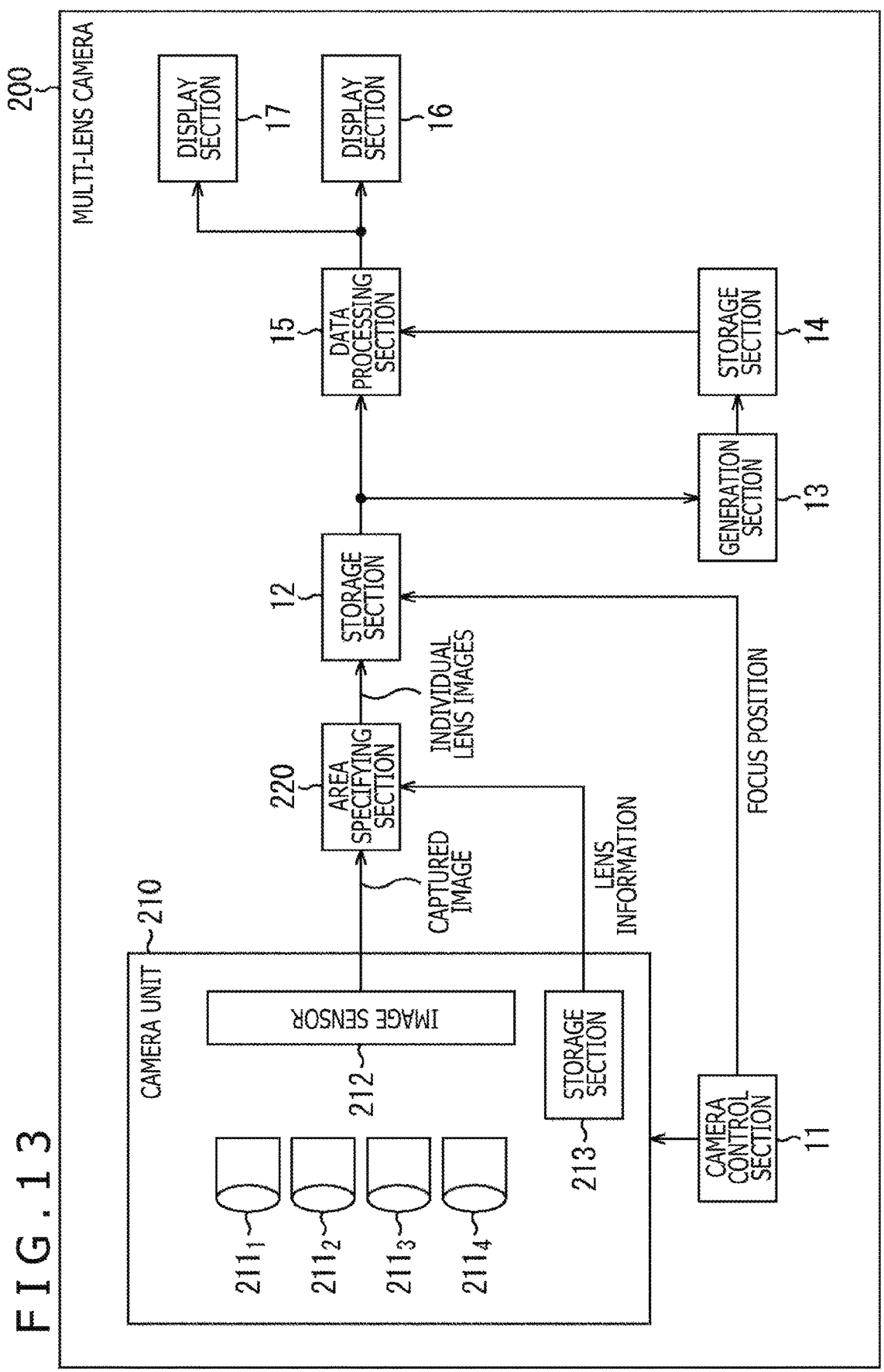
FIG. 13 is a block diagram illustrating a configuration example of a second embodiment of the multi-lens camera to which the present technology is applied.

FIG. 13 is a block diagram illustrating a configuration example of a second embodiment of the multi-lens camera to which the present technology is applied.

It should be noted that elements corresponding to those depicted in FIG. 1 are designated by the same reference numerals as the corresponding elements and will not be redundantly described below.

A multi-lens camera 200 depicted in FIG. 13 includes a camera control section 11, a storage section 12, a generation section 13, a storage section 14, a data processing section 15, a display section 16, a storage section 17, a camera unit 210, and an area specifying section 220.

Consequently, the multi-lens camera 200 is similar to the multi-lens camera 1 in that the former includes the camera control section 11, the storage section 12, the generation section 13, the storage section 14, the data processing section 15, the display section 16, and the storage section 17.

However, the multi-lens camera 200 differs from the multi-lens camera 1 in that the former includes the camera unit 210 instead of the camera units $10_1$ and $10_2$.

The camera unit 210 includes single-eye lenses $211_1$ to $211_4$, an image sensor 212, and a storage section 213.

The single-eye lenses $211_1$ to $211_4$ are disposed in such a manner that they do not overlap with each other (when viewed) in the direction of optical axis, and used to focus light from an object on the image sensor 212.

The image sensor 212 receives light incident through the single-eye lenses $211_1$ to $211_4$ (light focused by the single-eye lenses $211_1$ to $211_4$), photoelectrically converts the received light to obtain a captured image including single-eye images corresponding respectively to the single-eye lenses $211_1$ to $211_4$ (single-eye images corresponding to images formed by the light focused respectively by the single-eye lenses $211_1$ to $211_4$), and supplies the obtained captured image to the area specifying section 220.

The storage section 213 stores lens information, which is information regarding the single-eye lenses $211_1$ to $211_4$. The lens information includes area specifying information. The area specifying information specifies areas within a captured image acquired by the image sensor 212 (a single image sensor) where single-eye images corresponding respectively to the single-eye lenses $211_1$ to $211_4$ are depicted.

Area information indicating the area of each single-eye image within the captured image may be adopted as the area specifying information. The area information indicates, for example, the location and size of each single-eye image within the captured image, such as the coordinates of upper left and lower right points (pixels) in each single-eye image within the captured image, the coordinates of an upper left or other predetermined point in each single-eye image within the captured image, and the size of each single-eye image (e.g., horizontal and vertical size values).

Based on the lens information supplied from the storage section 213, the area specifying section 220 specifies the areas of the single-eye images corresponding respectively to the single-eye lenses $211_1$ to $211_4$, which are within the captured image supplied from the image sensor 212, and outputs area specifying result information indicative of area specifying results.

In the above instance, as the area specifying result information, the area specifying section 220 is able to output, for example, a set of the captured image and the area information indicating the area of each single-eye image within the captured image. Further, the area specifying section 220 is able to extract (cut out) each single-eye image from the captured image and output each extracted single-eye image as the area specifying result information.

For ease of explanation, the following description assumes, for example, that the area specifying section 220 outputs each single-eye image extracted from the captured image (the single-eye images corresponding respectively to the single-eye lenses $211_1$ to $211_4$ in this instance) as the area specifying result information.

The single-eye images corresponding respectively to the single-eye lenses $211_1$ to $211_4$ and outputted from the area specifying section 220 are supplied to the storage section 12.

In the above instance, according to the configuration depicted in FIG. 1, the storage section 12 stores focus positions supplied from the camera control section 11 in association with captured images that are obtained by exercising control to set focus at the focus positions and supplied respectively from the image sensors $102_1$ and $102_2$. However, according to the configuration depicted in FIG. 13, the storage section 12 stores focus positions supplied from the camera control section 11 in association with single-eye images corresponding respectively to the single-eye lenses $211_1$ to $211_4$ and extracted from captured images that are obtained by exercising control to set focus at the focus positions and supplied from the area specifying section 220.

It should be noted that the camera unit 210 depicted in FIG. 13 includes four single-eye lenses $211_1$ to $211_4$. However, the number of single-eye lenses $211_i$ included in the camera unit 210 is not limited to four. Alternatively, the camera unit 210 may include any plural number of single-eye lenses $211_i$, for example, two, three, or five or more single-eye lenses $211_i$.

Further, the plurality of single-eye lenses $211_1$ to $211_4$ to be included in the camera unit 210 may differ from each other in angle of view and other specifications. However, for ease of explanation, it is assumed in the following description that the camera unit 210 includes a plurality of lenses built to the same specifications.

Moreover, the single-eye images obtained by the lenses $211_1$ to $211_4$ are captured from viewpoints corresponding to the locations of the single-eye lenses $211_1$ to $211_4$. Therefore, four single-eye images obtained by the single-eye lenses $211_1$ to $211_4$ are images captured from different viewpoints.

For example, after the multi-lens camera 200 having the above-described configuration is manufactured, the calibration mode is set as the operation mode of the multi-lens camera 200, as is the case with the multi-lens camera 1, and calibration is performed, for example, in a plant for manufacturing the multi-lens camera 200.

Stated differently, the camera unit 210 included in the multi-lens camera 200 is controlled so as to focus at a standard focus position and capture an image of a calibration chart disposed at the standard focus position. Then, the area specifying section 220 included in the multi-lens camera 200 extracts single-eye images (hereinafter referred to as the calibration single-eye images) captured from four different viewpoints, which correspond respectively to the locations of the single-eye lenses $211_1$ to $211_4$, from a calibration image obtained by capturing the image of the calibration chart, and stores the extracted calibration single-eye images in the storage section 12. Further, the generation section 13 generates calibration data for the standard focus position from the calibration single-eye images stored in the storage section 12, and stores the generated calibration data in the storage section 14.

Calibration is performed on a plurality of standard focus positions. This results in the generation of calibration data for the plurality of standard focus positions.

When the multi-lens camera 200 is shipped from a manufacturing plant subsequently to calibration, the general imaging mode is set as the operation mode of the multi-lens camera 200. In the general imaging mode, as is the case in the calibration mode, single-eye images captured from four different viewpoints corresponding respectively to the locations of the single-eye lenses $211_1$ to $211_4$ are extracted from a general captured image captured by the camera unit 210.

The single-eye images captured from four different viewpoints corresponding respectively to the locations of the single-eye lenses $211_1$ to $211_4$ and extracted from the general captured image are then stored in the storage section 12 in association with an imaging focus position employed to capture the general captured image including the single-eye images acquired from four different viewpoints.

The data processing section 15 included in the multi-lens camera 200 performs interpolation to generate calibration data for the imaging focus position stored in the storage section 12 by using calibration data for a plurality of standard focus positions that are stored in the storage section 14. Further, the data processing section 15 not only regards a single-eye image captured from one of four different viewpoints corresponding respectively to the locations of the single-eye lenses $211_1$ to $211_4$ and associated with the imaging focus position as the standard viewpoint image, but also regards single-eye images captured from the remaining three viewpoints as the reference viewpoint images, and generates parallax information by using the calibration data for the imaging focus position. This results in the generation of accurate parallax information that is not significantly affected, for example, by lens distortion.

As described above, at the time of calibration, the area specifying section 220 included in the multi-lens camera 200, which obtains a captured image including single-eye images captured from four different viewpoints corresponding respectively to the locations of the single-eye lenses $211_1$ to $211_4$, extracts single-eye images acquired from four different viewpoints corresponding respectively to the locations of the single-eye lenses $211_1$ to $211_4$ from the calibration images captured by the camera unit 210 at a plurality of standard focus positions. Then, the generation section 13 generates calibration data for the plurality of standard focus positions from single-eye images (calibration single-eye images) captured from the four different viewpoints and extracted from the calibration images.

Further, at the time of general imaging, the data processing section 15 (that includes the interpolation section 153) included in the multi-lens camera 200 performs interpolation to generate calibration data for a predetermined focus position (imaging focus position) different from the plurality of standard focus positions by using the calibration data for the plurality of standard focus positions.

Consequently, by using the calibration data for the predetermined focus position (imaging focus position) different from the plurality of standard focus positions, the multi-lens camera 200 is able to perform appropriate image processing on single-eye images that are captured from the four different viewpoints corresponding respectively to the locations of the single-eye lenses $211_1$ to $211_4$ and extracted from a general captured image obtained at the imaging focus position.

<Computer to which Present Technology is Applied>

Next, the above-described series of processes, such as those in the generation section 13 and the data processing section 15 (that includes the interpolation section 153), can be performed by hardware or by software. In a case where the series of processes is to be performed by software, programs included in the software are installed on a computer.

Figure 14:
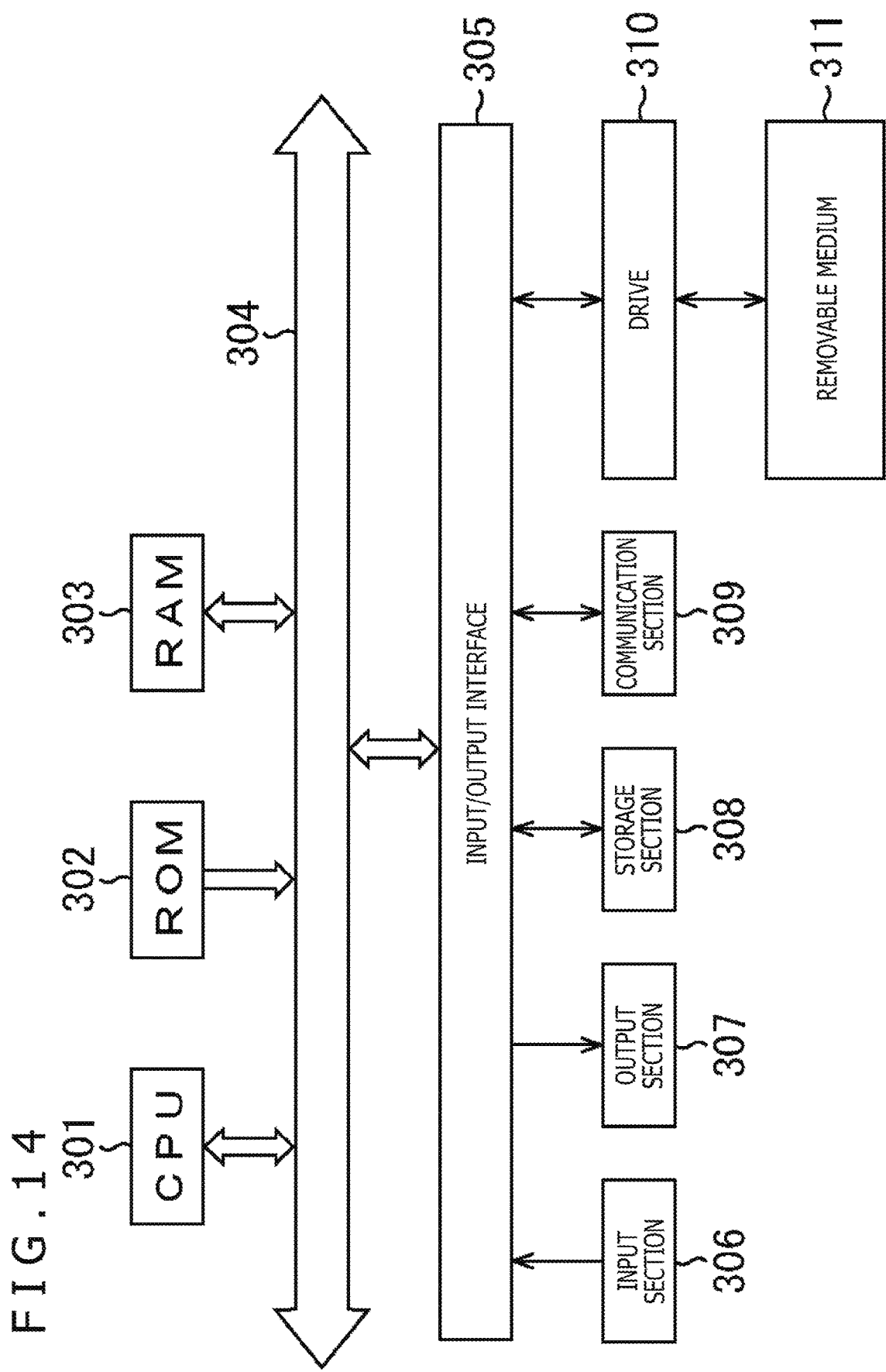
FIG. 14 is a block diagram illustrating a configuration example of an embodiment of a computer to which the present technology is applied.

Hence, FIG. 14 illustrates a configuration example of an embodiment of the computer on which the programs performing the above-described series of processes are to be installed.

In FIG. 14, a CPU (Central Processing Unit) 301 performs various processes in accordance with the programs stored in a ROM (Read Only Memory) 302 or with the programs loaded into a RAM (Random Access Memory) 303 from a storage section 308. Additionally, the RAM 303 stores, as needed, for example, data necessary for the CPU 301 to perform the various processes.

The CPU 301, the ROM 302, and the RAM 303 are interconnected by a bus 304. The bus 304 is further connected to an input/output interface 305.

The input/output interface 305 is connected to an input section 306 including, for example, a keyboard and a mouse, a display including, for example, an LCD (liquid crystal display), an output section 307 including, for example, a speaker, a storage section 308 including, for example, a hard disk, and a communication section 309 including, for example, a modem and a terminal adapter. The communication section 309 performs a communication process through a network such as the Internet.

The input/output interface 305 is further connected, as needed, to a drive 310. Removal medium 311, such as a magnetic disk, an optical disk, a magneto-optical disk, and a semiconductor, are inserted as needed into the drive 310. Computer programs read from the removal medium 311 are installed, as needed, in the storage section 308.

It should be noted that the programs to be executed by the computer may perform processing in a chronological order described in this document or perform processing, for example, in a parallel manner or at a necessary time point in response to a program call.

The embodiments of the present technology are not limited to those described above, and may be variously modified without departing from the scope and spirit of the present technology.

It should be noted that the advantages described in this document are merely illustrative and not restrictive. The present technology may additionally provide advantages other than those described in this document.

<Other>

The present technology may adopt the following configurations.

(1)

A data processing apparatus including:

an interpolation section that performs interpolation to generate calibration data for a predetermined focus position by using calibration data for a plurality of focus positions, the calibration data for the plurality of focus positions being generated from a calibration image captured at the plurality of focus positions, the calibration image being obtained by capturing an image of a known object in the plurality of focus positions with a multi-lens camera that captures an image from two or more viewpoints.

(2)

The data processing apparatus according to (1), in which the interpolation section performs interpolation to generate calibration data for a focus position of the multi-lens camera that is employed when an image of a predetermined object is captured by the multi-lens camera.

(3)

The data processing apparatus according to (1), in which the calibration data includes information regarding positional displacement between a position where the known object is imaged within the calibration image and a true position where the known object should be imaged within the calibration image.

(4)

The data processing apparatus according to (3), in which the information regarding the positional displacement indicates a difference between the positional displacement of the calibration image captured from a standard viewpoint and the positional displacement of the calibration image captured from a viewpoint other than the standard viewpoint, the standard viewpoint being one of the two or more viewpoints of the multi-lens camera.

(5)

The data processing apparatus according to (1), in which the interpolation section performs interpolation to generate calibration data for a combination of a predetermined focus position and a predetermined zoom magnification by using calibration data for a combination of a plurality of different focus positions and a plurality of different zoom magnifications, the calibration data for the combination of the plurality of different focus positions and the plurality of different zoom magnifications being generated from a calibration image that is obtained by allowing the multi-lens camera to capture an image of the known object in the plurality of different focus positions at the plurality of different zoom magnifications.

(6)

The data processing apparatus according to any one of (1) to (5), further including:

a parallax information generation section that generates parallax information regarding parallax from a captured image by using the calibration data, the captured image being captured from two or more viewpoints by allowing the multi-lens camera to capture an image of a predetermined object.

(7)

A data processing method including:

performing interpolation to generate calibration data for a predetermined focus position by using calibration data for a plurality of focus positions, the calibration data for the plurality of focus positions being generated from a calibration image captured at the plurality of focus positions, the calibration image being obtained by capturing an image of a known object in the plurality of focus positions with a multi-lens camera that captures an image from two or more viewpoints.

(8)

A program causing a computer to function as:

an interpolation section that performs interpolation to generate calibration data for a predetermined focus position by using calibration data for a plurality of focus positions, the calibration data for the plurality of focus positions being generated from a calibration image captured at the plurality of focus positions, the calibration image being obtained by capturing an image of a known object in the plurality of focus positions with a multi-lens camera that captures an image from two or more viewpoints.

(9)

A data processing method including:

generating calibration data for a plurality of focus positions from a calibration image captured at a plurality of focus positions, the calibration image being obtained by capturing an image of a known object in the plurality of focus positions with a multi-lens camera that captures an image from two or more viewpoints.

REFERENCE SIGN LIST

1 Multi-lens camera, $10_i$ Camera unit, 11 Camera control section, 12 Storage section, 13 Generation section, 14 Storage section, 15 Data processing section, 16 Display section, 17 Storage section, $101_i$ Lens, $102_i$ Image sensor, 151 Read section, 152 Interpolation section, 153 Calibration section, 154 Parallax information generation section, 200 Multi-lens camera, 210 Camera unit, $211_i$ Lens, 212 Image sensor, 213 Storage section, 220 Area specifying section, 301 CPU, 302

ROM, 303 RAM, 304 Bus, 305 Input/output interface, 306 Input section, 307 Output section, 308 Storage section, 309 Communication section, 310 Drive, 311 Removable disk

The invention claimed is:

1. An image data processing apparatus, comprising:
 circuitry configured to:
  acquire, from a multi-lens camera including a first imager at a first viewpoint and a second imager at a second viewpoint different from the first viewpoint, a first captured image of the first imager and a second captured image of the second imager with respect to a plurality of focus positions of the multi-lens camera, wherein
   the plurality of focus positions of the multi-lens camera is different from one another, and
   each of the first captured image and the second captured image includes a known object; and
  generate calibration data by interpolation of parallax information which represents a parallax between the first captured image and the second captured image, wherein
   the interpolation is based on a pixel difference between a first pixel position in the first captured image and a second pixel position in the second captured image,
   the calibration data is generated as two-dimensional data based on the plurality of focus positions and the pixel difference, and
   each of the first pixel position and the second pixel position corresponds to a position of the known object through the plurality of focus positions.

2. An image data processing method, comprising:
 acquiring, from a multi-lens camera including a first imager at a first viewpoint and a second imager at a second viewpoint different from the first viewpoint, a first captured image of the first imager and a second captured image of the second imager with respect to a plurality of focus positions of the multi-lens camera, wherein
  the plurality of focus positions of the multi-lens camera is different from one another, and
  each of the first captured image and the second captured image includes a known object, and
 generating calibration data by interpolating parallax information representing a parallax between the first captured image and the second captured image, wherein
  the interpolation is based on a pixel difference between a first pixel position in the first captured image and a second pixel position in the second captured image,
  the calibration data is generated as two-dimensional data based on the plurality of focus positions and the pixel difference, and
  each of the first pixel position and the second pixel position corresponds to a position of the known object through the plurality of focus positions.

3. A multi-lens camera, comprising:
 a camera unit including:
  an image sensor; and
  a plurality of lens imagers including a first imager at a first viewpoint and a second imager at a second viewpoint different from the first viewpoint; and
 a storage unit configured to store calibration data where parallax information representing a parallax between a first captured image of the first imager and a second captured image of the second imager is interpolated, wherein
  each of the first captured image and the second captured image includes a known object, and
  the calibration data is generated as two-dimensional data based on:
   a plurality of focus positions of the multi-lens camera, wherein the plurality of focus positions is different from one another; and
   a pixel difference between a first pixel position in the first captured image and a second pixel position in the second captured image, wherein each of the first pixel position and the second pixel position corresponds to a position of the known object through the plurality of the focus positions.

4. An image data processing apparatus, comprising:
 circuitry configured to:
  acquire, from a multi-lens camera including a first imager at a first viewpoint and a second imager at a second viewpoint different from the first viewpoint, a first captured image of the first imager and a second captured image of the second imager with respect to a plurality of focus positions of the multi-lens camera, wherein
   the plurality of focus positions of the multi-lens camera is different from one another, and
   each of the first captured image and the second captured image includes a known object; and
  generate calibration data by interpolation of parallax information which represents a parallax between the first captured image and the second captured image, wherein
   the interpolation is based on a pixel difference between a first pixel position in the first captured image and a second pixel position in the second captured image,
   the calibration data is generated as three-dimensional data based on the plurality of focus positions, the pixel difference, and a plurality of zoom magnifications of the multi-lens camera corresponding to the pixel difference and the plurality of focus positions, and
   each of the first pixel position and the second pixel position corresponds to a position of the known object through the plurality of focus positions.

5. An image data processing method, comprising:
 acquiring, from a multi-lens camera including a first imager at a first viewpoint and a second imager at a second viewpoint different from the first viewpoint, a first captured image of the first imager and a second captured image of the second imager with respect to a plurality of focus positions of the multi-lens camera, wherein
  the plurality of focus positions of the multi-lens camera is different from one another, and
  each of the first captured image and the second captured image includes a known object; and
 generating calibration data by interpolating parallax information representing a parallax between the first captured image and the second captured image, wherein
  the interpolation is based on a pixel difference between a first pixel position in the first captured image and a second pixel position in the second captured image,
  the calibration data is generated as three-dimensional data based on the plurality of focus positions, the pixel difference, and a plurality of zoom magnifications of the multi-lens camera corresponding to the pixel difference and the plurality of focus positions, and each of the first pixel position and the second pixel position corresponds to a position of the known object through the plurality of focus positions.

6. A multi-lens camera, comprising:
a camera unit including:
   an image sensor; and
   a plurality of lens imagers including a first imager at a first viewpoint and a second imager at a second viewpoint different from the first viewpoint; and
a storage unit configured to store calibration data where parallax information representing a parallax between a first captured image of the first imager and a second captured image of the second imager is interpolated, wherein
   each of the first captured image and the second captured image includes a known object, and
   the calibration data is generated as three-dimensional data based on:
      a plurality of focus positions of the multi-lens camera, wherein the plurality of focus positions is different from one another;
      a pixel difference between a first pixel position in the first captured image and a second pixel position in the second captured image, wherein each of the first pixel position and the second pixel position corresponds to a position of the known object through the plurality of the focus positions; and
      a plurality of zoom magnifications of the multi-lens camera corresponding to the pixel difference and the plurality of focus positions.

* * * * *